United States Patent

Sasaki et al.

[11] Patent Number: 6,023,605
[45] Date of Patent: Feb. 8, 2000

[54] DUAL LAYER SATELLITE COMMUNICATIONS SYSTEM AND GEOSTATIONARY SATELLITE THEREFOR

[75] Inventors: Takao Sasaki; Tadayoshi Katoh, both of Kawasaki, Japan

[73] Assignee: Fujitsu Limited, Kanagawa, Japan

[21] Appl. No.: 08/925,287

[22] Filed: Sep. 8, 1997

[30] Foreign Application Priority Data

Mar. 19, 1997 [JP] Japan .................................. 9-066671

[51] Int. Cl.$^7$ ................................................. H04B 7/185
[52] U.S. Cl. .................... 455/12.1; 455/430; 455/13.1; 455/13.2; 342/354
[58] Field of Search ............................... 455/12.1, 13.1, 455/427, 428, 429, 430, 13.2, 13.3; 244/158 R; 370/316, 323, 325; 342/359, 368, 352, 354

[56] References Cited

U.S. PATENT DOCUMENTS

| | | |
|---|---|---|
| 4,287,598 | 9/1981 | Langseth et al. ...................... 455/12.1 |
| 5,184,139 | 2/1993 | Hirako et al. ........................... 342/354 |
| 5,555,444 | 9/1996 | Dickelman et al. ................... 455/12.1 |
| 5,722,042 | 2/1998 | Kimura et al. ......................... 455/13.1 |
| 5,790,070 | 8/1998 | Natarajan et al. .................... 455/13.3 |
| 5,887,257 | 3/1999 | Olds ....................................... 455/427 |
| 5,906,337 | 5/1999 | Williams et al. ...................... 455/13.1 |

*Primary Examiner*—Reinhard J. Eisenzopf
*Assistant Examiner*—Lester G. Kincaid
*Attorney, Agent, or Firm*—Helfgott & Karas, P.C.

[57] ABSTRACT

The system allows a plurality of earth stations to communicate with one another by relaying transmission signals via satellites circling the earth in high earth and low earth orbits. A geostationary satellite operates in a geostationary orbit, while a plurality of low-earth orbiting satellites circle the earth in low-earth orbits. Those satellites serve as repeaters for the communications between a first earth station and a second earth station. Tracking relay means, disposed in the geostationary satellite, tracks only a limited number of low-earth orbiting satellites within an orbital range that corresponds to a predetermined area on the earth. Accordingly, the tracking relay means relays transmission signals of the second earth station to the low-earth orbiting satellites only when they are within the orbital range.

12 Claims, 25 Drawing Sheets

DUAL LAYER SATELLITE COMMUNICATIONS SYSTEM AND GEOSTATIONARY SATELLITE THEREFOR

BACKGROUND OF THE INVENTION

1. Field of the Invention

The present invention relates to a dual layer satellite communications system and a geostationary satellite therefor. More particularly, the present invention relates to a dual layer satellite communications system which allows a plurality of earth stations to communicate with one another by relaying transmission signals via satellites in low-earth and high-earth orbits, and also to a geostationary satellite used in that satellite communications system.

2. Description of the Related Art

Dual layer satellite communications systems have a hybrid space segment constituted by low-earth orbiting satellites and high-earth orbiting satellites. The low-earth orbiting satellites are used to communicate with small-scale users as part of the earth segment, while the high-earth orbiting satellites are used to link large-scale users on the earth. Further, intersatellite links are provided to allow the low-earth and high-earth satellites to communicate with one another. Thanks to the less free-space loss, the small-scale users can make access to the nearest satellite in a low-earth orbit by using a smaller terminal. On the other hand, a high-earth orbiting satellite provides longer service hours because of its smaller angular velocity relative to the earth's rotation, thus allowing large-scale users to enjoy the benefit of long time, stable communication services.

On the other hand, in low-earth orbit satellite communications networks with a single-layer configuration, many earth stations must track a low-earth orbiting satellite, and the terrestrial communications links have to relay the transmission signals to an earth station within the present coverage area illuminated by the satellite. As opposed to this, satellite tracking is easily achieved in dual layer satellite communications systems and it is thus possible to reduce the number of terrestrial relay stations to track the satellites. Such advantages make the dual layer systems more attractive.

FIG. 25 illustrates a dual layer satellite communications network system proposed by several researchers today. This network system comprises the following entities: small earth stations 101 and 102, many low-earth orbiting satellites 103a–103e (including non-labeled satellite constellations in other orbits in FIG. 25) that directly communicate with the small earth stations 101 and 102, a fewer number of high-earth orbiting satellites 104–109 that track the low-earth orbiting satellites to relay their transmission signals, big earth stations 110 and 111 that directly communicate with the high-earth orbiting satellites 104–109, and a switching system 113 that directly communicates with the high-earth orbiting satellites 104–109 as well as making a connection to terrestrial networks 112. In FIG. 25, the intersatellite links are depicted as the solid bidirectional arrows. With those links, the low-earth orbiting satellite 103a–103e and high-earth orbiting satellite 104–109 can communicate with each other while orbiting the earth.

In this conventional satellite communications network system, the low-earth orbiting satellites 103a–103e and high-earth orbiting satellites 104–109 have to track each other for communication purposes. High technologies must be introduced to achieve accurate tracking because all satellites are moving, and it certainly is one factor that makes the system more complicated.

There is another problem with the communication links between the high-earth orbiting satellites 104–109 and the big earth stations 110 and 111 or switching system 113. Since the high-earth orbiting satellites 104–109 appear to move when observed from the earth, the big earth stations 110 and 111 or switching system 113 are required to change the direction of antenna beams throughout a wide angular range. Therefore, the frequencies assigned to one satellite link cannot be reused in other satellite systems, which is a great disadvantage when considering an effective use of radio bandwidth resources. This problem situation becomes more serious particularly in high-speed data communication systems which inherently occupy a wider radio bandwidth, and such usage of frequency bands may not be allowed by the competent authorities supervising the radio wave resources.

The use of a geostationary orbit may be an option for the high-earth orbiting satellite deployment. However, such a geostationary satellite must be equipped with many antennas and a complicated tracking control subsystem to acquire and track all visible low-earth orbiting satellites. Those requirements could make the satellite too large to realize.

SUMMARY OF THE INVENTION

Taking the above into consideration, an object of the present invention is to provide a dual layer satellite communications system which has a less complicated structure and thus allows miniaturization of high-earth orbiting satellites. Another object of the present invention is to provide a geostationary satellite suitable for the above dual layer satellite communications system.

To accomplish the above object, according to the present invention, there is provided a dual layer satellite communications system that allows a plurality of earth stations to communicate with one another by relaying transmission signals via satellites circling the earth in high earth and low earth orbits. This system comprises: a first earth station located on the earth's surface; a second earth station located on the earth's surface; a geostationary satellite circling the earth in a high-earth geostationary orbit, which always faces a predetermined area on the earth; a plurality of low-earth orbiting satellites circling the earth in low earth orbits for relaying transmission signals between the geostationary satellite and the first earth station; tracking relay means, disposed in the geostationary satellite, for relaying transmission signals to/from the low-earth orbiting satellites, while tracking the low-earth orbiting satellites within an orbital range that corresponds to the predetermined area on the earth; and a network control station located on the earth's surface, which acquires relative positions of the first and second earth stations, the geostationary satellite, and the plurality of low-earth orbiting satellites, and sends tracking information to the first and second earth stations, the geostationary satellite, and the plurality of low-earth orbiting satellites.

To accomplish the above object there is also provided a geostationary satellite for a dual layer satellite communications system that allows a plurality of earth stations to communicate with one another by relaying transmission signals via satellites circling the earth in high earth and low earth orbits. The geostationary satellite comprises tracking relay means for tracking low-earth orbiting satellites within an orbital range that corresponds to a predetermined area on the earth to relay transmission signals to/from low-earth orbiting satellites.

The above and other objects, features and advantages of the present invention will become apparent from the fol-

DESCRIPTION OF THE PREFERRED EMBODIMENTS

Several embodiments of the present invention will be described below with reference to the accompanying drawings.

Figure 1:
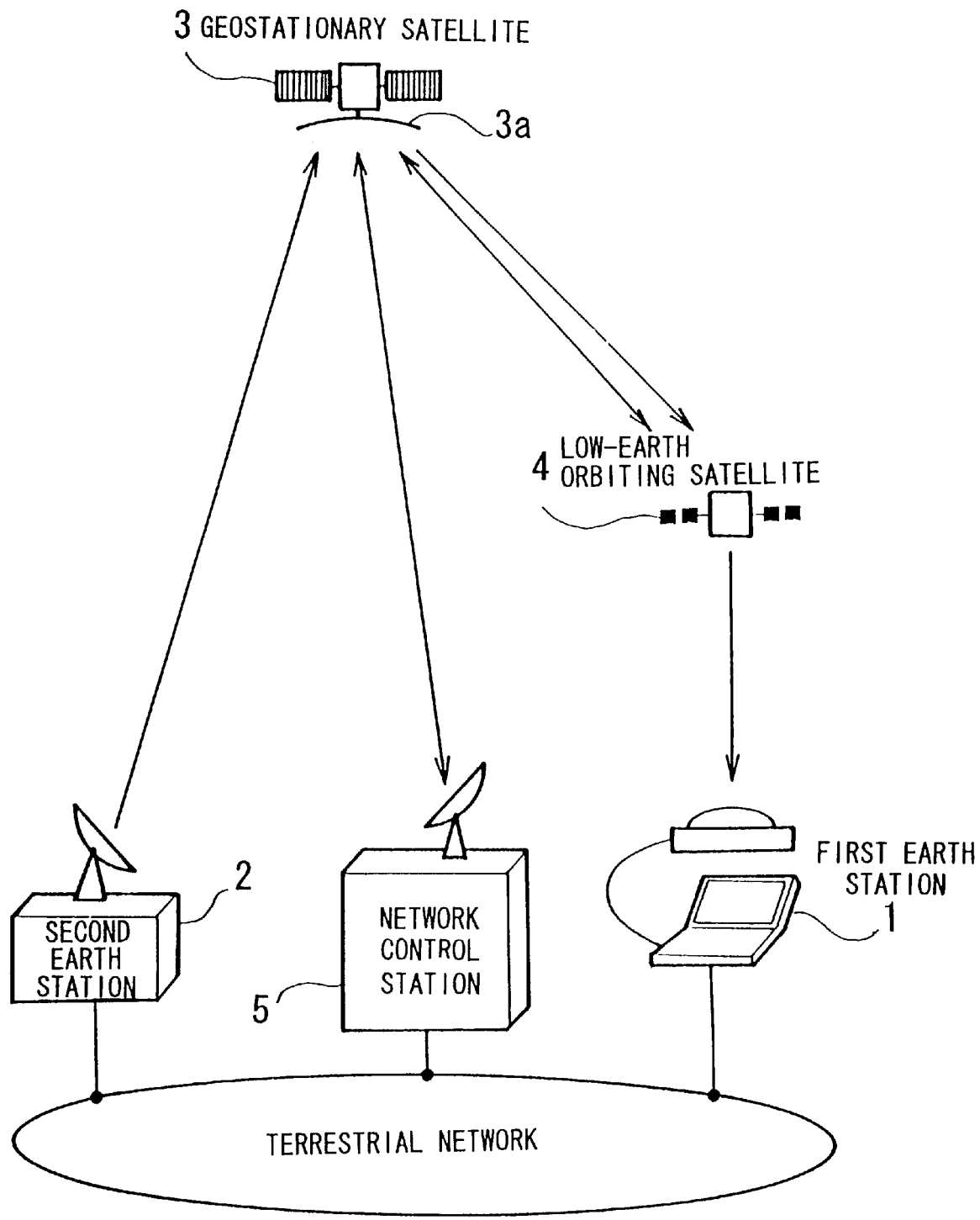
FIG. 1 is a conceptual view of the present invention.

Referring first to FIG. 1, the following description will present the concept of a first embodiment of the present invention. A dual layer satellite communications system illustrated in FIG. 1 comprises the following entities:

a first earth station 1 located on the earth's surface;

a second earth station 2 located on the earth's surface;

a geostationary satellite 3 circling the earth in a high-earth geostationary orbit, which always faces a predetermined area on the earth;

a plurality of low-earth orbiting satellites 4 (although FIG. 1 depicts only one satellite) circling the earth in low earth orbits for relaying transmission signals between the geostationary satellite 3 and the first earth station 1;

tracking relay means 3a, disposed in the geostationary satellite 3, for relaying transmission signals to/from the low-earth orbiting satellites 4, while tracking the low-earth orbiting satellites 4 within an orbital range that corresponds to the predetermined area on the earth; and a network control station 5 located on the earth's surface, which acquires relative positions of the first earth station 1, the second earth station 2, the geostationary satellite 3, and the plurality of low-earth orbiting satellites 4, and sends tracking information to the first earth station 1, the second earth stations 2, the geostationary satellite 3, and the plurality of low-earth orbiting satellites 4.

In the above-described structural arrangement, the geostationary satellite 3 circles the earth in a high-earth orbit, while the plurality of low-earth orbiting satellites 4 go round in low earth orbits. The first earth station 1 communicates with the second earth station 2 via the geostationary satellite 3 and low-earth orbiting satellites 4 which are serving as relaying stations, or repeaters, in space.

The network control station 5 acquires the relative positions of the first and second earth stations 1 and 2, geostationary satellite 3, and low-earth orbiting satellites 4, thereby obtaining tracking data. The network control station 5 supplies the tracking data to those earth stations and satellites. Based on the tracking data received from the network control station 5, the tracking relay means 3a disposed in the geostationary satellite 3 tracks only a small number of low-earth orbiting satellites that presently reside within a limited orbital range corresponding to a limited area on the earth's surface. Thus the tracking relay means 3a functions as a repeater to interconnect the second earth station 2 and low-earth orbiting satellites only when they are within the limited orbital range.

More specifically, the geostationary satellite 3 illuminates a prescribed area on the earth's surface. Such an area is called the "coverage area" or "footprint" of a satellite. However, the tracking relay means 3a does not support all the low-earth orbiting satellites flying above this coverage area. Rather, it tracks only a few low-earth orbiting satellites that have entered into a limited orbital range corresponding to a small part of the coverage area of the geostationary satellite 3. This functional limitation makes the tracking relay means 3a simple and small.

Moreover, the use of a geostationary orbit for the high-earth space segment simplifies the satellite acquisition and tracking, as well as eliminating the necessity of intersatellite links between low-earth orbiting satellites. Therefore, the dual layer satellite communication system of the present invention can be realized easily.

Referring now to FIGS. 2 to 20, the first embodiment of the present invention will be described in more detail.

Figure 2:
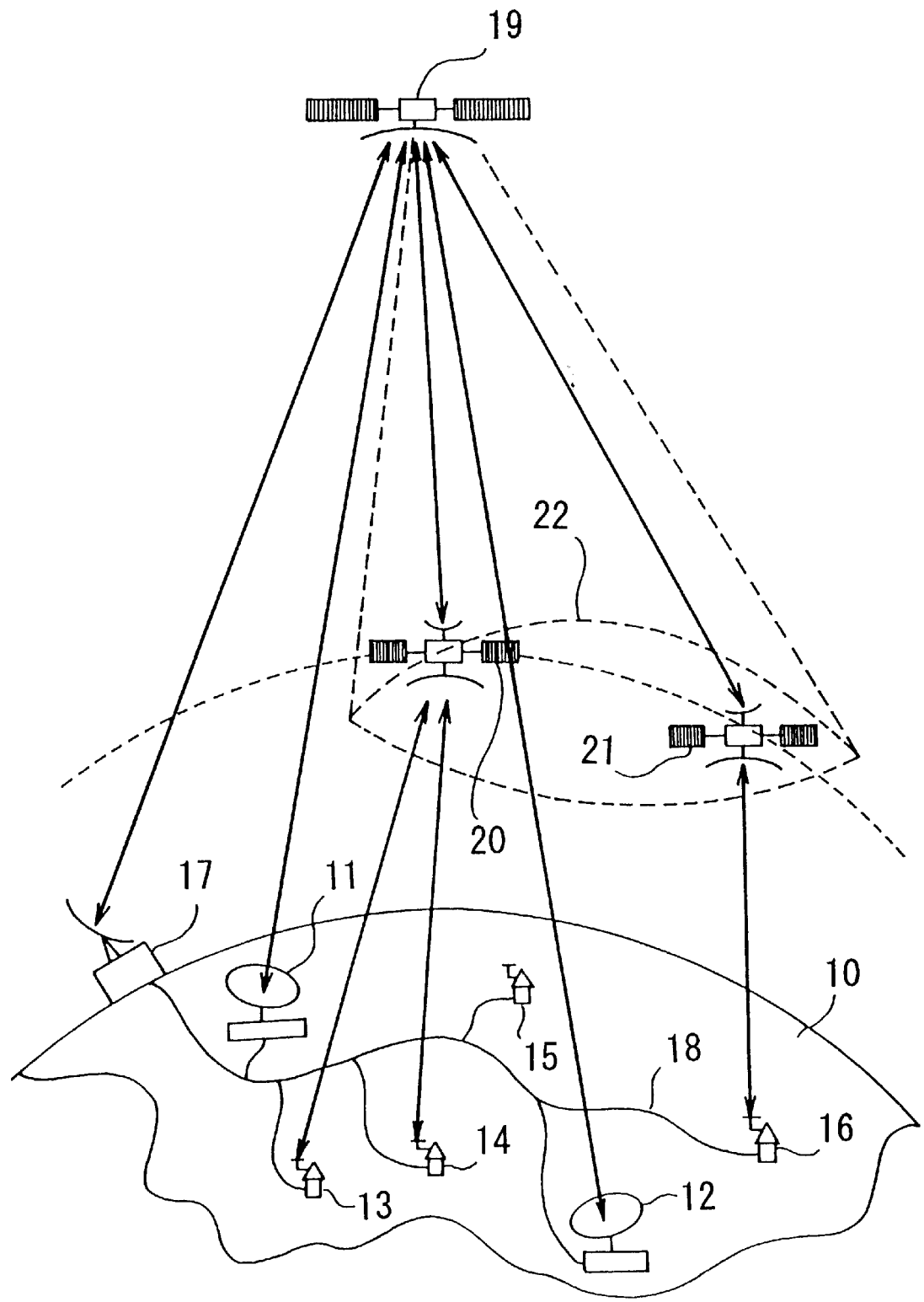
FIG. 2 is a diagram showing the detailed structure of a first embodiment of the present invention.

FIG. 2 shows the detailed structure of the first embodiment of the present invention. The earth segment of the system comprises big earth stations 11 and 12, small earth stations 13 to 16, and a network control earth station 17. Those earth stations are interconnected by a terrestrial network 18. A geostationary satellite 19 operates in a geosynchronous high-earth orbit, while low-earth orbiting satellites 20 and 21 go round the earth 10 in a low-earth orbit. Orbiting the earth 10 in synchronization with its rotation, the geostationary satellite 19 appears as if it were stopped when viewed from its coverage area on the earth 10. Therefore, the geostationary satellite 19 is always accessible to the big earth stations 11 and 12 and also to the network control earth station 17. The geostationary satellite 19 is also ready to communicate with some low-earth orbiting satellites, if any, within a predetermined orbital range 22. On the other hand, since the low-earth orbiting satellites 20 and 21 orbit the earth 10 at much higher speeds than the earth's rotation, they always appear moving when viewed from the surface of the earth 10. Accordingly, the low-earth orbiting satellites 20 and 21 can communicate with the geostationary satellite 19 only when they are within the predetermined orbital range 22. Here, imagine a cone (or oblique cone) that is formed by the geostationary satellite 19 and its coverage area on the earth's surface. The predetermined orbital range 22 is defined as an intersection of this (oblique) cone with a spherical surface given by the orbital altitude of the low-earth orbiting satellites 20 and 21. The low-earth orbiting satellite 20 and 21 can directly communicate with the small earth stations 13 to 16 as long as they are visible to each other.

Tracking the low-earth orbiting satellites within a predetermined orbital range 22, the geostationary satellite 19 relays data signals from the big earth stations 11 and 12 and network control earth station 17 to the available low-earth orbiting satellites. The low-earth orbiting satellites deliver the data to small earth stations that have been specified as the destinations. To achieve this data delivery, the low-earth orbiting satellites tracks the specified small earth stations, as well as keeping track of the geostationary satellite 19. Data transmission in the opposite direction can also be performed over the same path; the data signals from a small earth station is first sent to a low-earth orbiting satellite, relayed by the geostationary satellite 19, and then delivered to the big earth station 11 or 12 or the network control earth station 17.

The network control earth station 17 is responsible for channel establishment, disconnection, data retransmission request, and other functions for overall network control. The network control earth station 17 provides the geostationary satellite 19 and the small earth stations 13–16 with appropriate tracking data based on the detailed knowledge of the orbits of the low-earth orbiting satellites 20 and 21. Furthermore, it supplies the low-earth orbiting satellites 20 and 21 with data necessary for them to track the small earth stations 13–16. The further details of this network control earth station 17 will be discussed later with reference to FIGS. 7 to 20.

Figure 3:
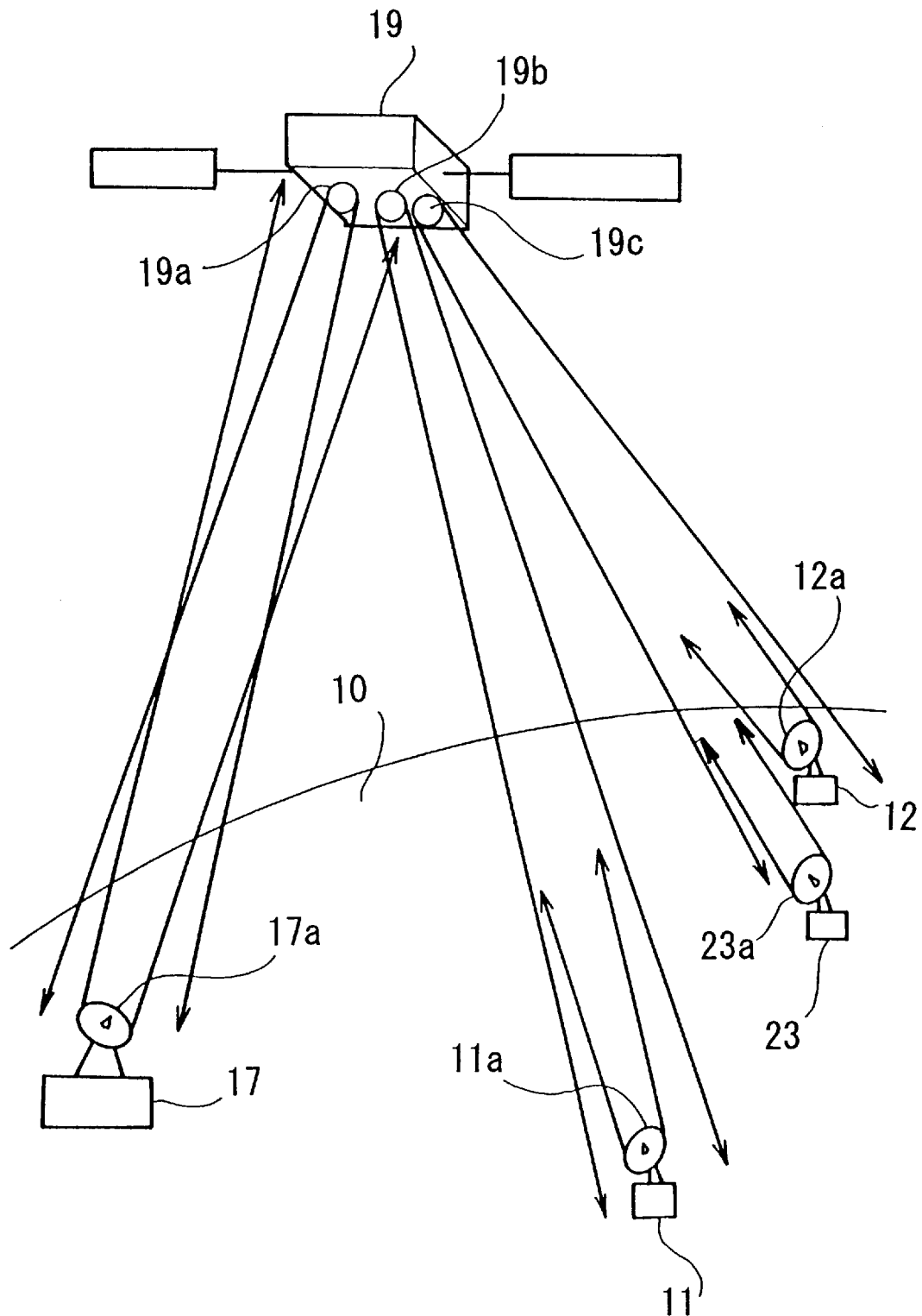
FIG. 3 is a diagram showing antennas for radio communications between a geostationary satellite and big earth stations and between a geostationary satellite and a network control earth station.

FIG. 3 explains antennas used in radio communications between the geostationary satellite 19 and big earth stations 11 and 12 and between the geostationary satellite 19 and network control earth station 17. The position of the geostationary satellite 19 relative to the network control earth station 17 is substantially fixed, and therefore, the network control earth station 17 and the geostationary satellite 19 are equipped with narrow-beam high-gain antennas 17a and 19a, respectively. As FIG. 3 illustrates, those antennas 17a and 19a are adjusted so that they will point to each other. The same type of antennas are used for radio links between the geostationary satellite 19 and the big earth stations 11 and 12. Note that FIG. 3 shows that another big earth station 23 is included in the same service area where the big earth station 12 resides. As such, the geostationary satellite 19 is required to have separate antennas 19b, 19c for different service areas to be covered.

Figure 4:
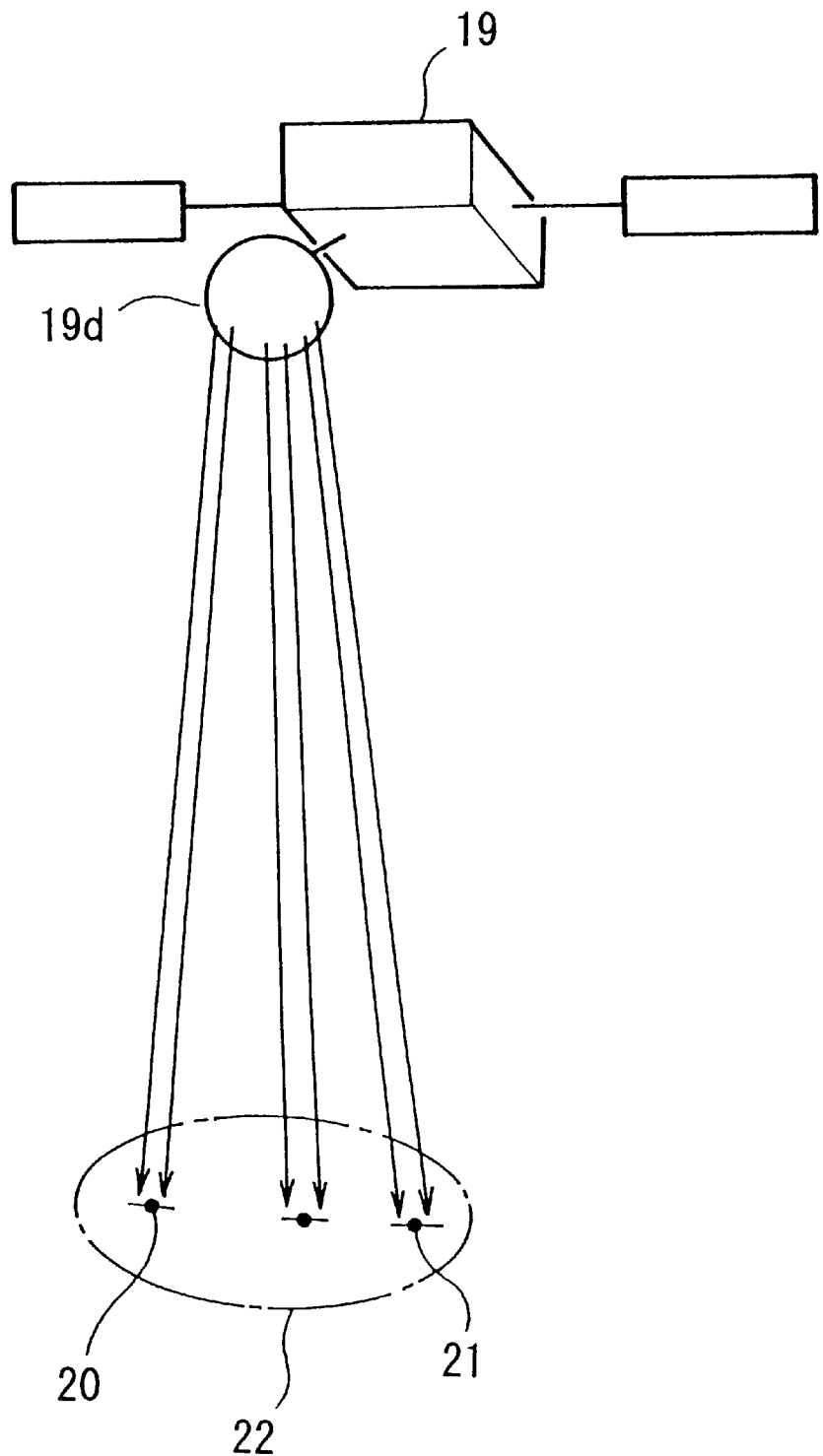
FIG. 4 is a diagram showing antennas for radio communications between a geostationary satellite and a plurality of low-earth orbiting satellites.

FIG. 4 shows an antenna used in radio communications between the geostationary satellite 19 and low-earth orbiting satellites 20 and 21. To keep track of a plurality of moving low-earth orbiting satellites 20, 21, and others within the predetermined orbital range 22, the geostationary satellite 19 has a multibeam antenna 19d.

Figure 5:
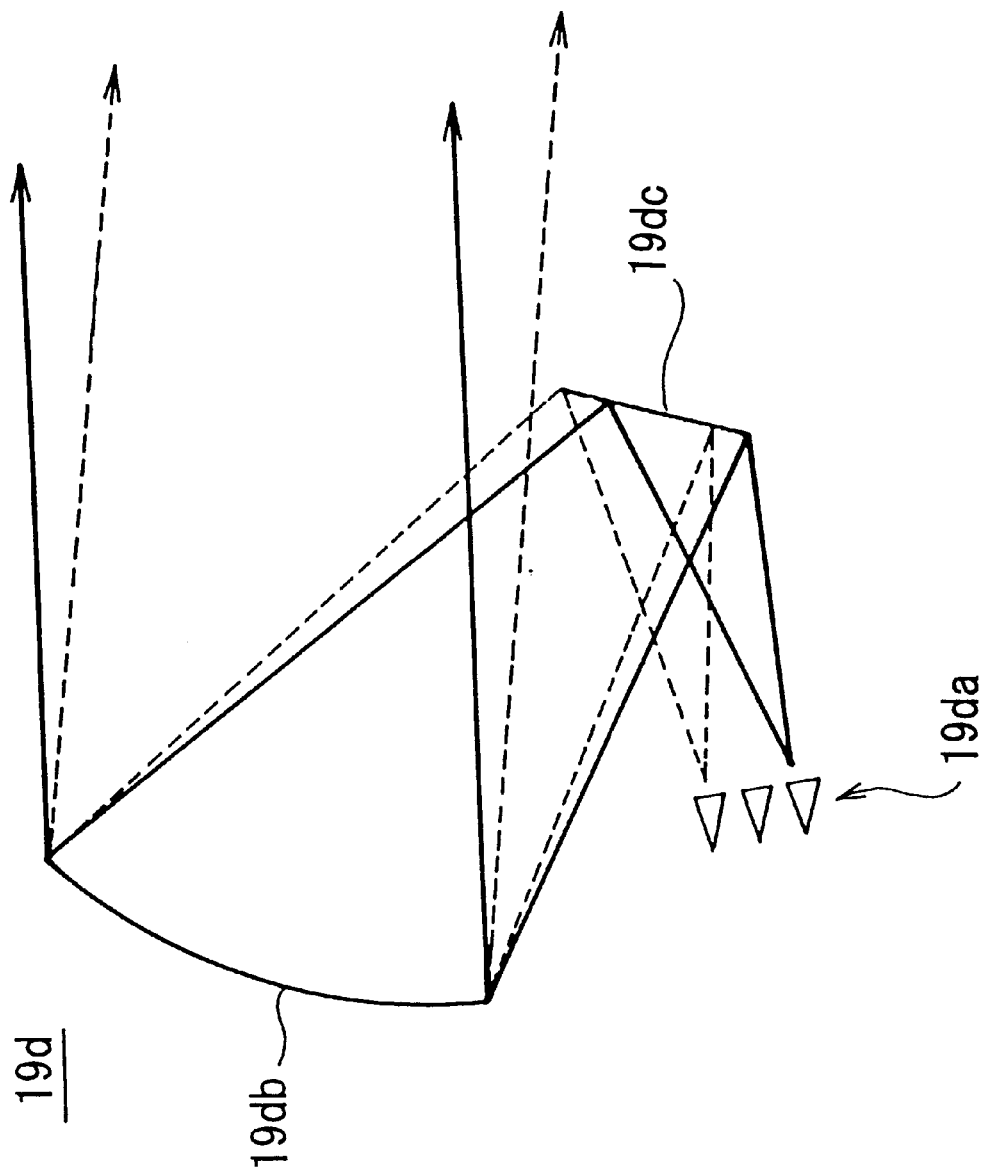
FIG. 5 is a diagram showing a typical structure of a multibeam antenna.

FIG. 5 shows the structure of this multibeam antenna 19d. The multibeam antenna 19d comprises a feed horn assembly 19da, a main reflector 19db, and a sub-reflector 19dc. The feed horn assembly consists of a plurality of horn elements. Antenna beam scanning is accomplished by electrically changing the power and phase of RF signals supplied to the individual horn elements, or by mechanically moving the feed horn assembly 19da.

Figure 6:
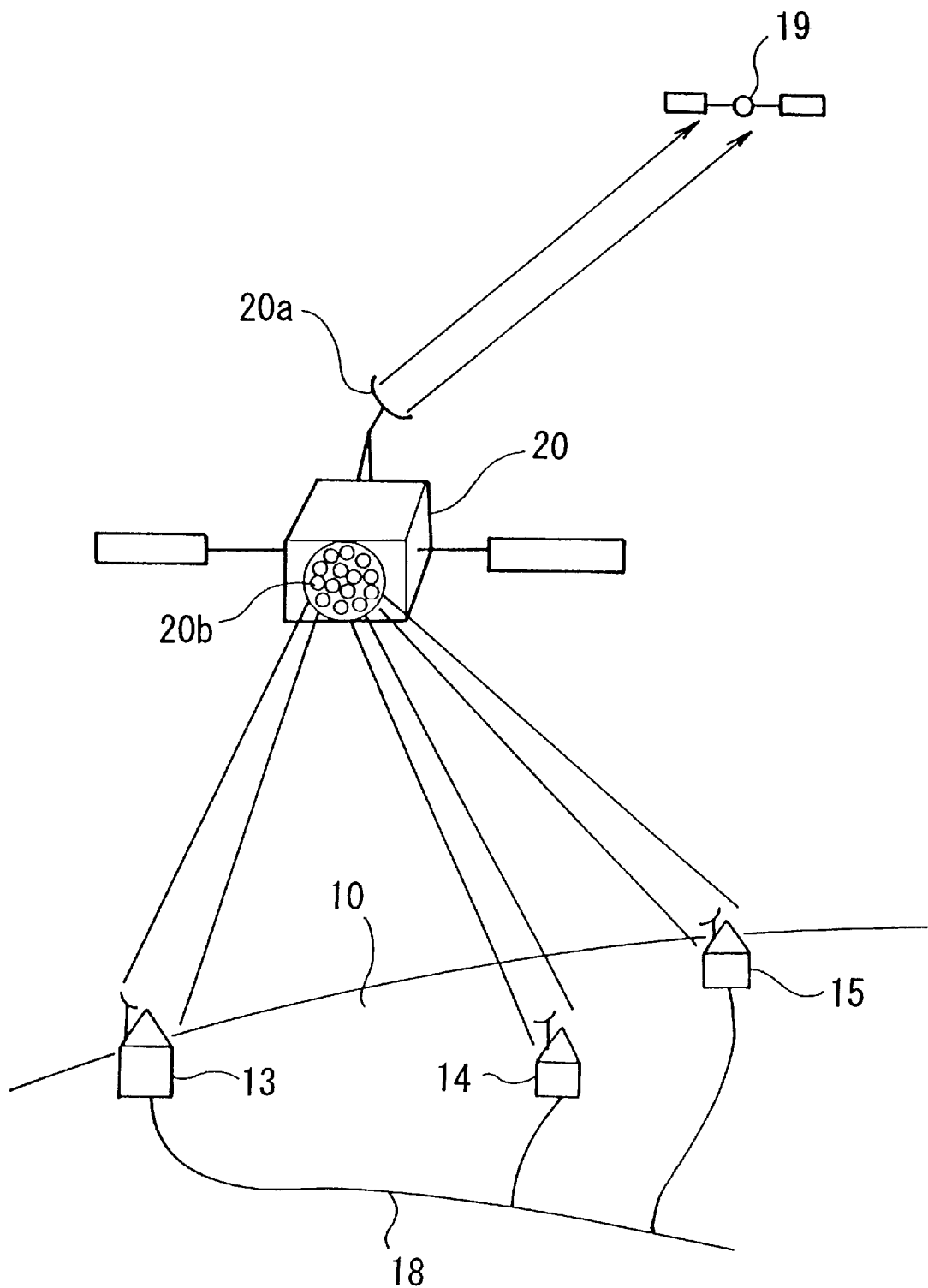
FIG. 6 is a diagram showing antennas required in radio communications between low-earth orbiting satellites and small earth stations.
Figure 7:
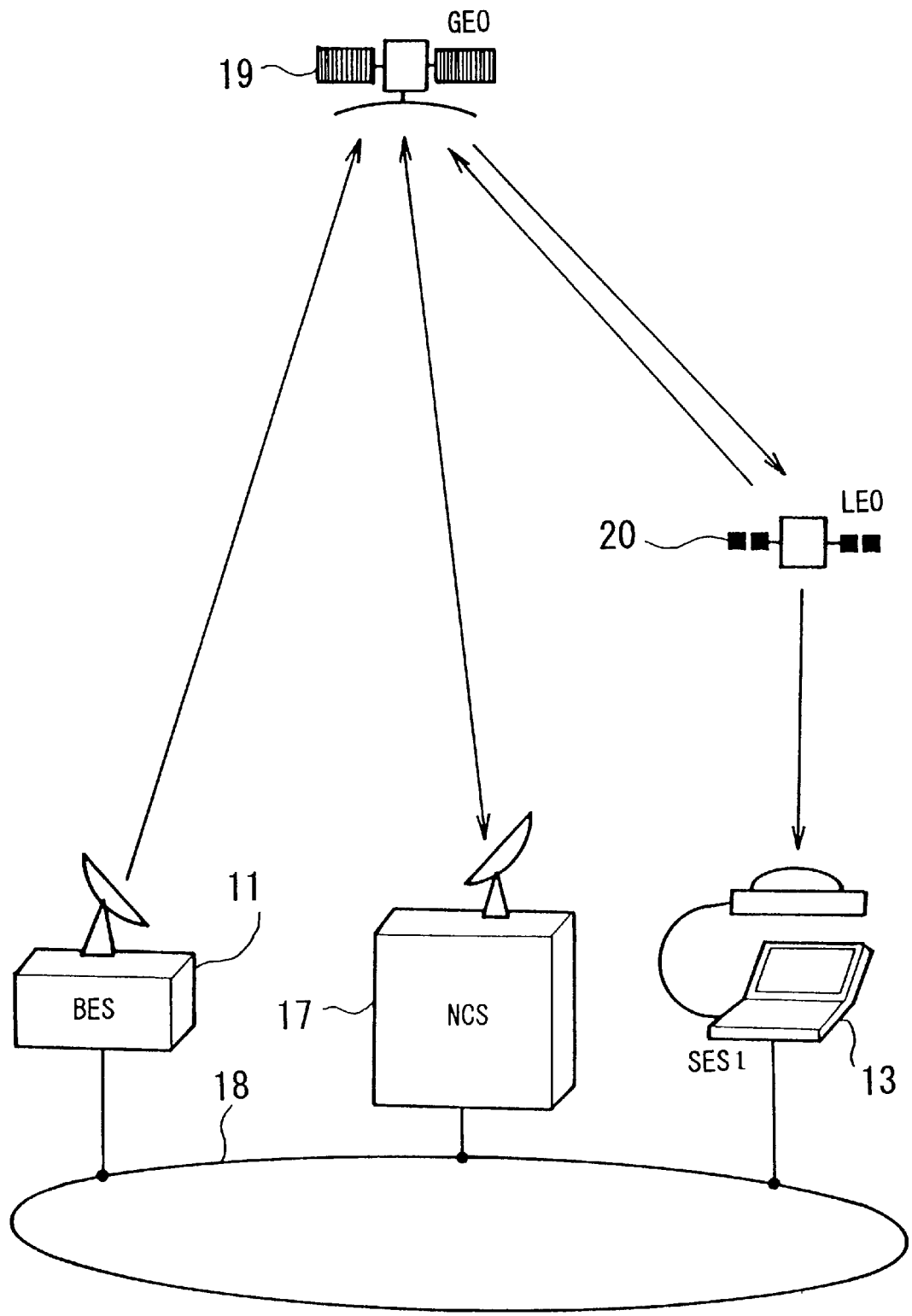
FIG. 7 is a simplified block diagram showing a unidirectional data transfer system.

FIG. 6 shows antennas used in radio communications between a low-earth orbiting satellite and small earth stations. While the following description only deals with the communication between the low-earth orbiting satellite 20 and small earth station 13–15 for illustrative purposes, other low-earth orbiting satellites and small earth stations operate in the same way.

Referring to FIG. 6, the low-earth orbiting satellite 20 employs a spherical antenna 20a to link with the geostationary satellite 19. This spherical antenna 20a is a high-gain directional antenna with a mechanical tracking facility designed for relatively slow movement of the target, i.e., the geostationary satellite 19. The low-earth orbiting satellite 20 is further equipped with a phased array antenna 20b to track the small earth station 13 to 15. The phased array antenna 20b is constructed as a collection of many small antenna elements, and its beam direction can be electrically varied by changing the frequencies or phases of the elements.

The small earth stations 13 to 15 are also equipped with phased array antennas. Alternately, offset parabolic antennas, similar to those used in satellite broadcast receivers, can be used for this purpose, although some tracking mechanisms should be attached thereto.

The above-described big earth stations 11 and 12 and small earth stations 13 to 15 communicate with each other via the geostationary satellite 19 and low-earth orbiting satellites 20 and 21. The protocols used in this data communication will now be explained below.

The data communication actually involves several difference situations that should be clarified separately. More specifically, the data communication includes a unidirectional data transfer from a big earth station to a small earth station, or a bidirectional data transfer between them. In addition to that, each data transfer may be initiated by a small earth station or, alternately, requested by a big earth station. Taking those into consideration, the following discussion will cover four different situations, CASE 1 to CASE 4. The discussion assumes, for simplicity, a satellite communications system of FIG. 7, which comprises a big earth station (BES) 11, a small earth station (SES1) 13, a geostationary satellite (GEO) 19, a network control earth station (NCS) 17, and a low-earth orbiting satellite (LEO) 20. The acronyms in parentheses are used to refer to the entities in the system.

CASE 1: SES1-Originated Unidirectional Data Transfer

Figure 8:
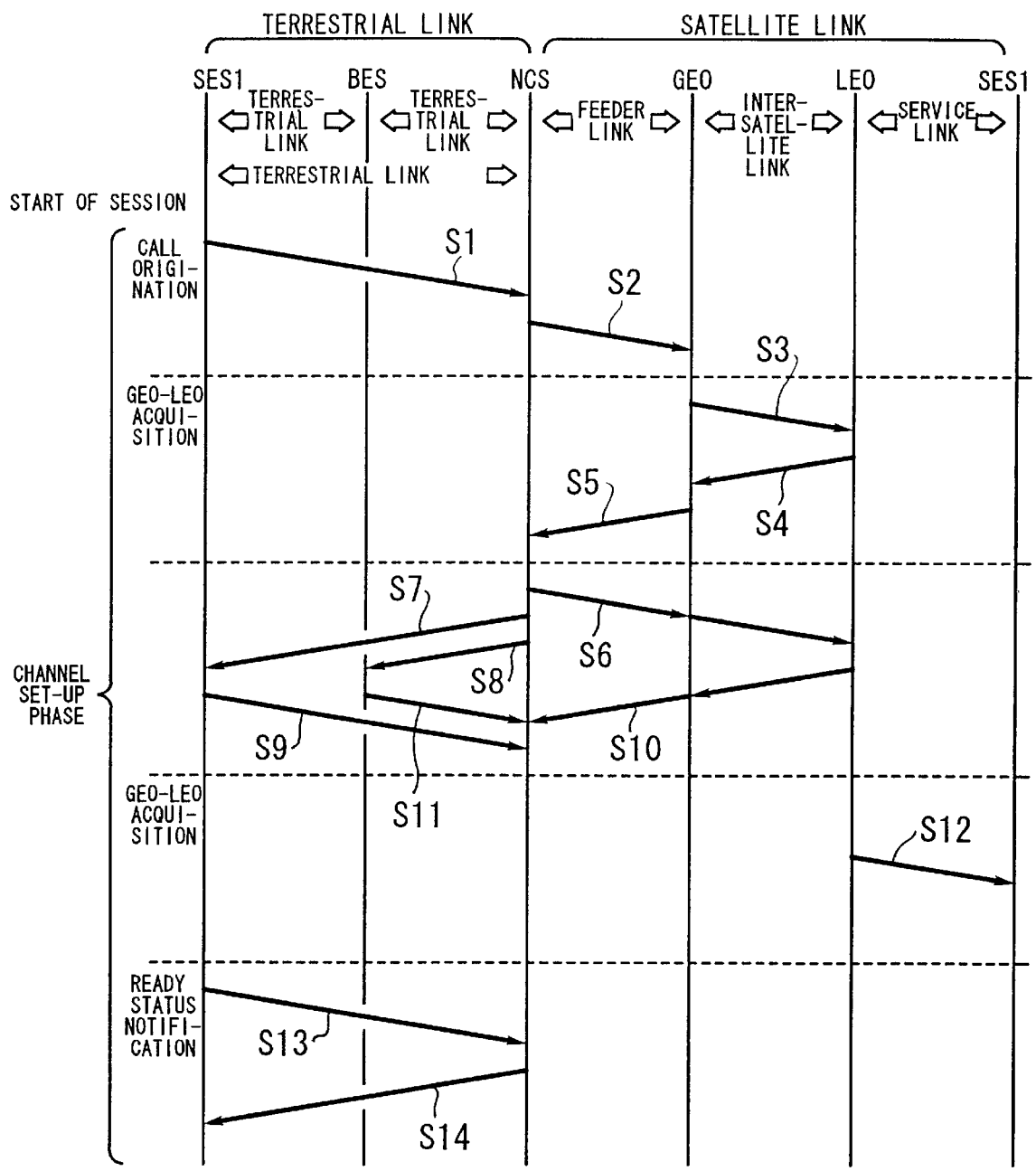
FIG. 8 is a sequence diagram showing a channel set-up phase in CASE 1.

FIG. 8 is a sequence diagram showing a channel set-up phase of CASE 1, whose details will be described below according to the order of step numbers shown therein.

[S1] A channel set-up request is sent from the SES1 to the NCS via the terrestrial network 18.

[S2] The NCS estimates the time required to transfer data and determines which low-earth orbiting satellite is the most suitable for the communication with the SES1. Here, the potential candidates are low-earth orbiting satellites that exist within the predetermined orbital range 22. Consider that the NCS has selected the LEO from among such candidates. The NCS then assigns a logical channel for the GEO-LEO communication and teaches the antenna direction to the GEO so that its acquisition and tracking system will be able to catch the LEO.

[S3] The GEO starts acquisition and tracking of the LEO.

[S4] The LEO acquires the GEO and sets up the GEO-LEO communication channel.

[S5] The GEO notifies the NCS of the establishment of the GEO-LEO communication channel.

[S6] Via the GEO, the NCS supplies the LEO with an antenna direction for acquisition and tracking of the SES1. The LEO aims its antenna beam as taught by the NCS in order to prepare for acquisition and tracking of the SES1.

[S7] The NCS supplies the SES1 with the direction of the LEO, estimated arrival time of radio waves from the LEO, and estimated duration of the data communication. The SES1 aims the antenna in the direction taught by the NCS to get ready for the acquisition and tracking of the LEO.

[S8] The NCS notifies the BES, the sending station, of the transmission start time and the communication duration.

[S9] The SES1 informs the NCS via the terrestrial network 18 that it is now ready for starting acquisition and tracking of the LEO.

[S10] The LEO informs the NCS via the GEO that it has made preparations for starting acquisition and tracking of the SES1.

[S11] The BES informs the NCS via the terrestrial network 18 that it is ready for starting the data transmission.

[S12] At the transmission start time, the LEO sends a signal to the SES1 to trigger the acquisition and tracking system in the SES1.

[S13] Upon receipt of the signal from the LEO, the SES1 informs the NCS via the terrestrial network 18 that it has successfully acquired the LEO.

[S14] Via the terrestrial network 18, the NCS informs the SES1 that the communication channel is established.

Figure 9:
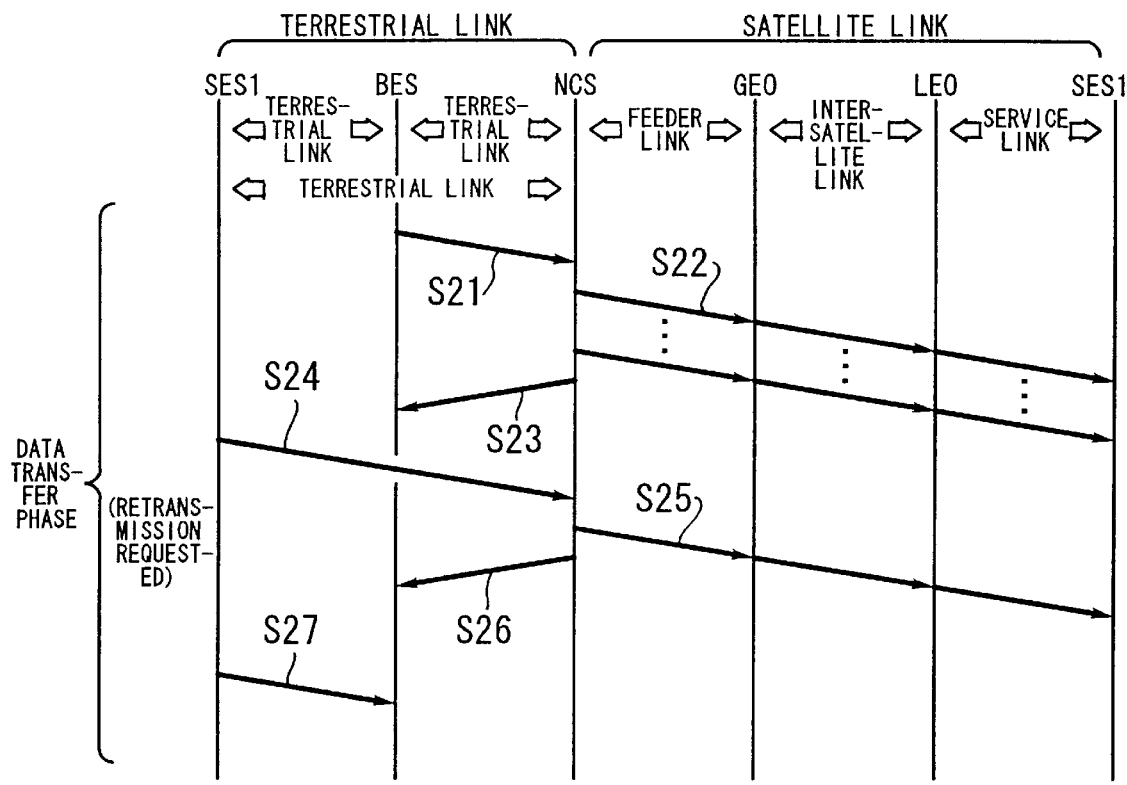
FIG. 9 is a sequence diagram showing a data transfer phase in CASE 1.

FIG. 9 is a sequence diagram showing a data transfer phase in the CASE 1, whose details will be described below according to the order of step numbers shown therein.

[S21] The NCS permits the BES to start data transmission.

[S22] The BES transmits data to the GEO. The data is relayed by the GEO-LEO satellite link and finally reaches the SES1.

[S23] When the whole data transmission is finished, the BES notifies the NCS of the completion.

[S24] Since the digital data transmission employs some coding techniques with error correction capabilities, bit errors having occurred during the transmission can be corrected at the receiving end. However, if there was a bursty error that could not be recovered by that correction function, the data should be retransmitted. Here, a selective retransmission algorithm is implemented to allow the sending station to retransmit only a frame that could not reach the destination. In FIG. 9, a retransmission request initiated by the SES1 is sent to the BES via the terrestrial network 18.

[S25] Upon receipt of the retransmission request, the BES transmits the specified frame again to the SES1 via the GEO-LEO satellite link.

[S26] When the whole data is transmitted, the BES notifies the NCS of the completion of retransmission via the terrestrial network 18.

[S27] Upon receipt of the retransmitted data, the SES1 notifies the NCS of the completion via the terrestrial network 18.

Figure 10:
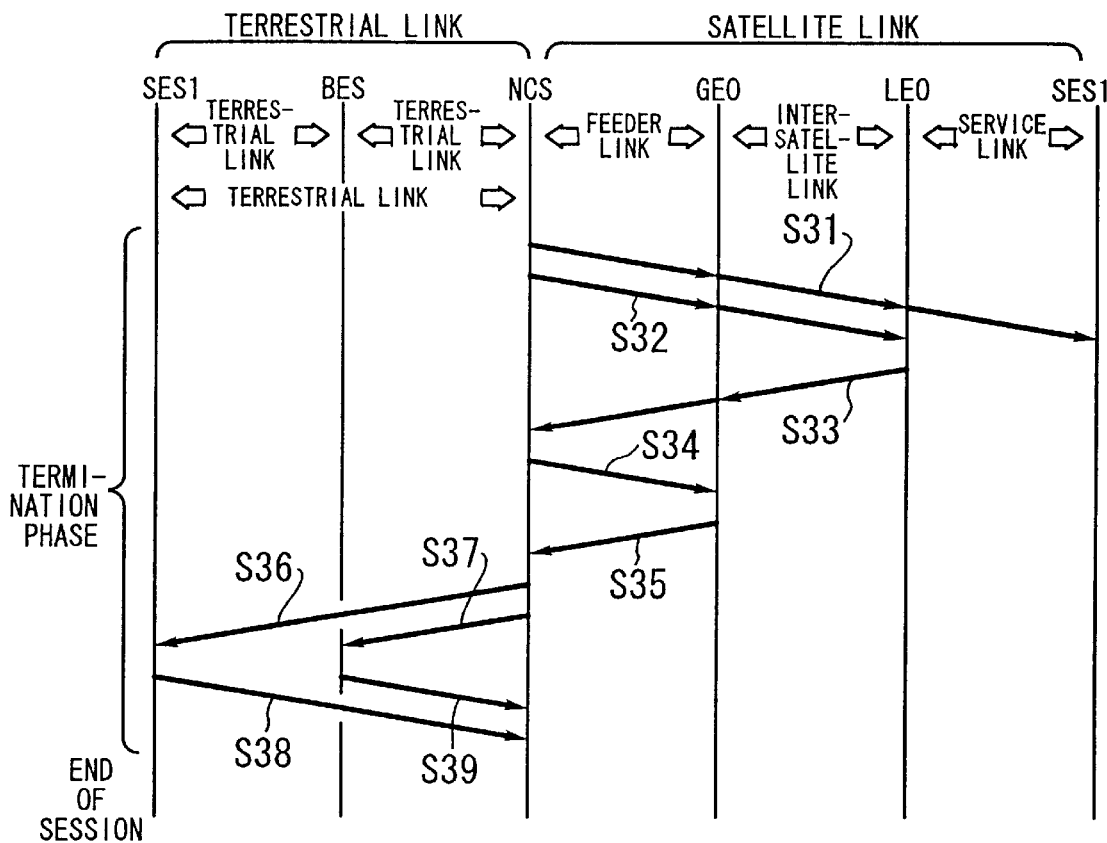
FIG. 10 is a sequence diagram showing a termination phase in CASE 1.

FIG. 10 is a sequence diagram showing a termination phase in CASE 1, whose details will be described below according to the order of step numbers shown therein.

[S31] Via the GEO-LEO satellite link, the NCS notifies the SES1 of the end of the data transmission session. Accordingly, the SES1 terminates the tracking operation for the LEO.

[S32] Via the GEO, the NCS notifies the LEO of the end of the data transmission session.

[S33] The LEO terminates the tracking of the SES1 and releases the communication channel. The LEO also sends its status information to the NCS and terminates the tracking of the GEO.

[S34] The NCS notifies the GEO of the end of the data transmission.

[S35] The GEO terminates the tracking operation of the LEO and releases the communication channel. The GEO sends its status information to the NCS.

[S36] Via the terrestrial network 18, the NCS notifies the SES1 of the end of the data transmission session.

[S37] Via the terrestrial network 18, the NCS notifies the BES of the end of the data transmission session.

[S38] The SES1 executes a termination process and sends its status information to the NCS via the terrestrial network 18.

[S39] The BES executes a termination process and sends its status information to the NCS via the terrestrial network 18. Now, the session is completely terminated.

CASE 2: BES-Originated Unidirectional Data Transfer

Figure 11:
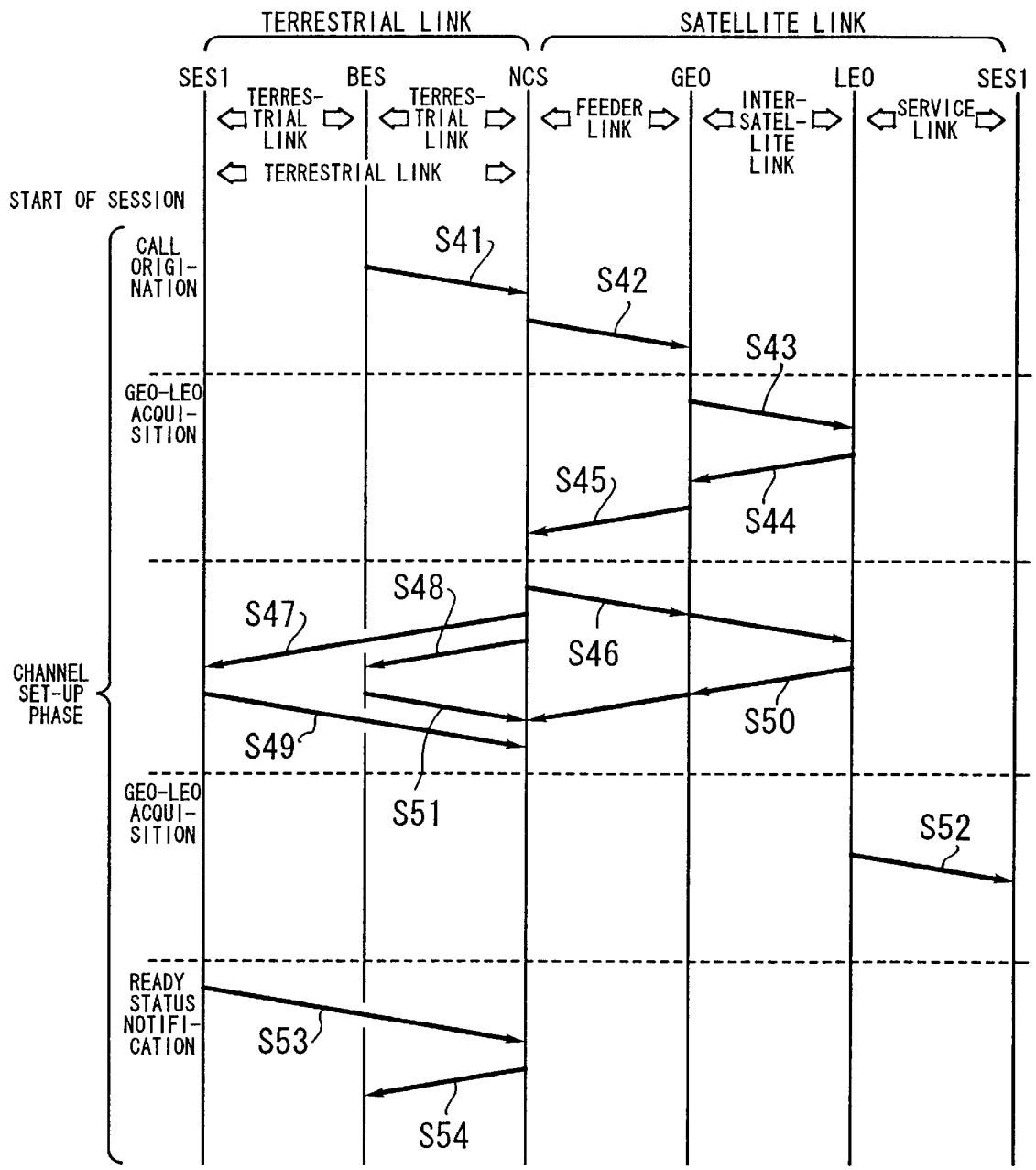
FIG. 11 is a sequence diagram showing a channel set-up phase in CASE 2.

FIG. 11 is a sequence diagram showing a channel set-up phase in CASE 2, whose steps will be described below according to the order of step numbers shown therein.

[S41] The BES sends a channel set-up request to the NCS via the terrestrial network 18.

[S42]-[S53] The detailed explanation is omitted here, since steps S42 to S53 are the same as steps S2 to S13 of FIG. 8.

[S54] Via the terrestrial network 18, the NCS informs the BES that the communication channel is established.

Figure 12:
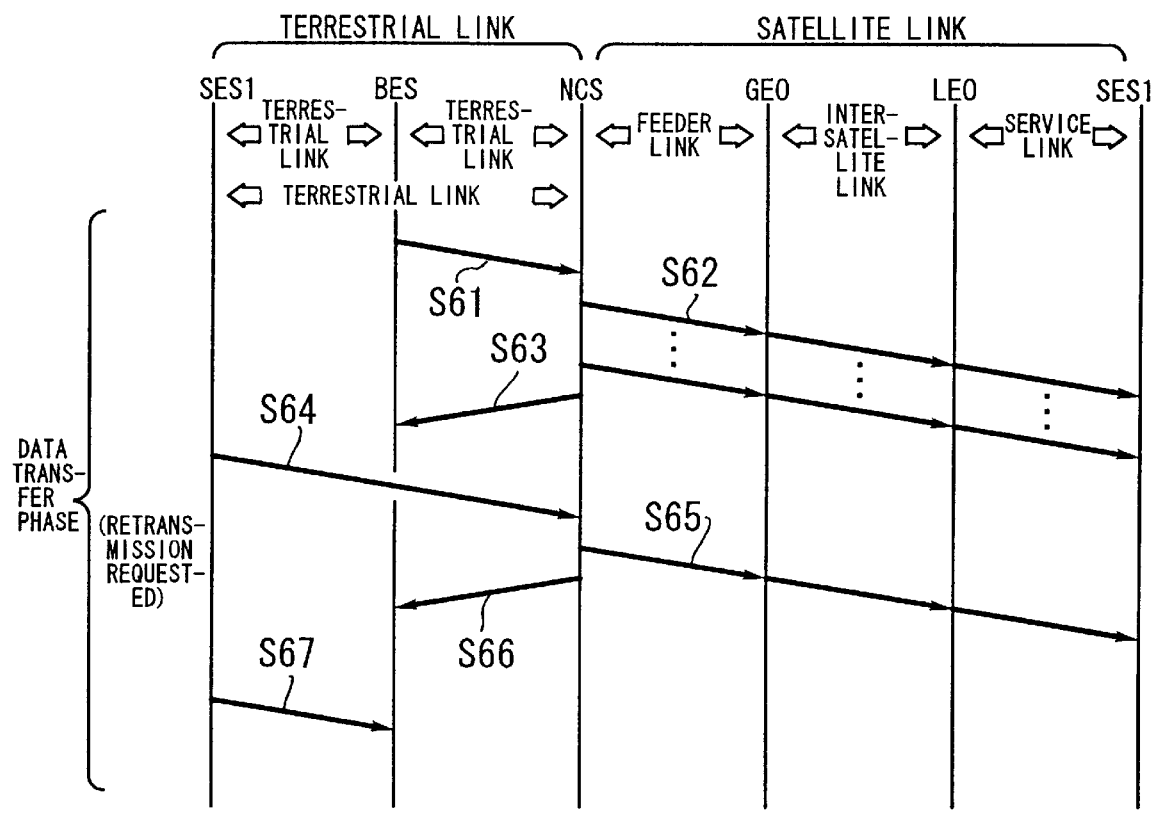
FIG. 12 is a sequence diagram showing a data transfer phase in CASE 2.

FIG. 12 is a sequence diagram showing a data transfer phase in CASE 2. The detailed explanation for steps S61 to S67, however, is not presented here, since they are exactly the same as step S21 to S27 in FIG. 9.

Figure 13:
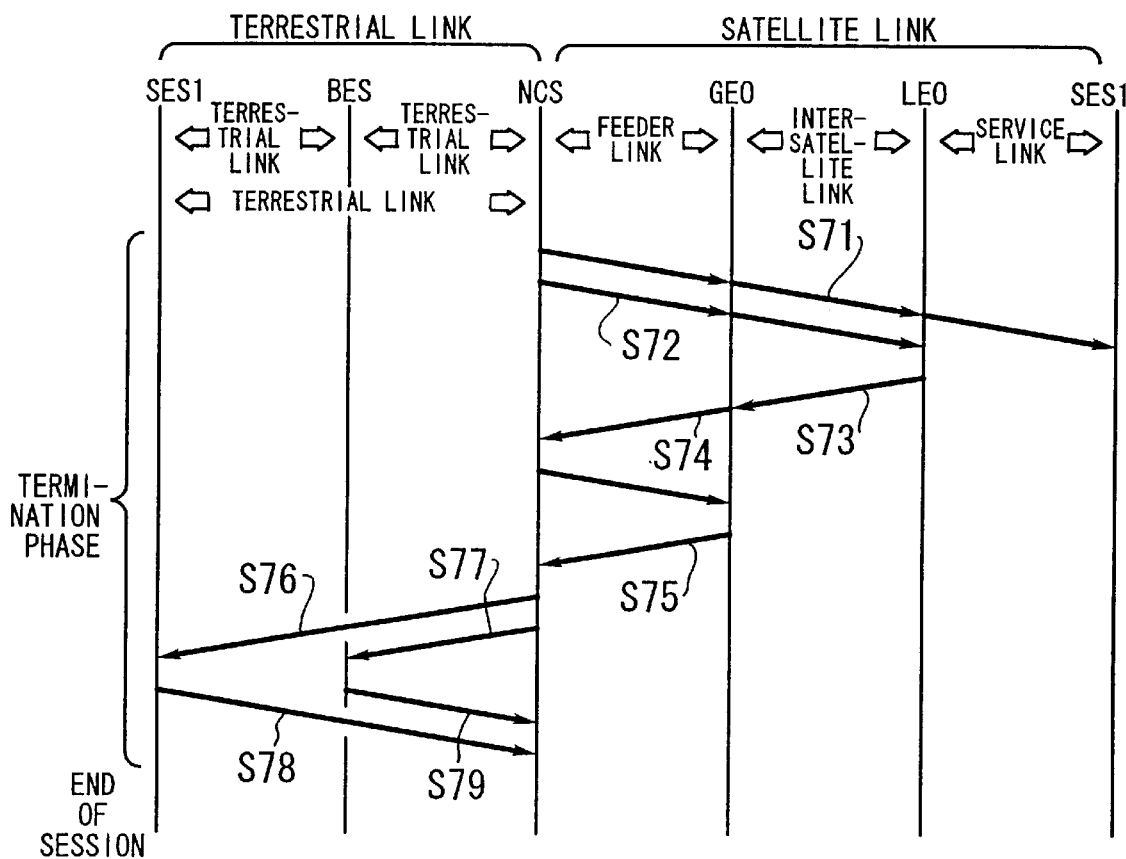
FIG. 13 is a sequence diagram showing a termination phase in CASE 2.

FIG. 13 is a sequence diagram showing a termination phase in CASE 2. The detailed explanation for steps S71 to S79, however, is not presented here, since they are exactly the same as step S31 to S39 in FIG. 10.

CASE 3: SES1-Originated Bidirectional Data Transfer

CASE 3 is a bidirectional data transfer whose session is requested by the SES1. Although most implementations may involve a plurality of big earth stations, small earth stations, and low-earth orbiting satellites, the following discussion assumes a simplified satellite communications system shown in FIG. 14, which comprises a big earth station (BES) 11, a small earth station (SES2) 14, a network control earth station (NCS) 17, a geostationary satellite (GEO) 19, and a low-earth orbiting satellite (LEO) 20. The acronyms in parentheses are used to refer to the entities in the system.

Figure 15:
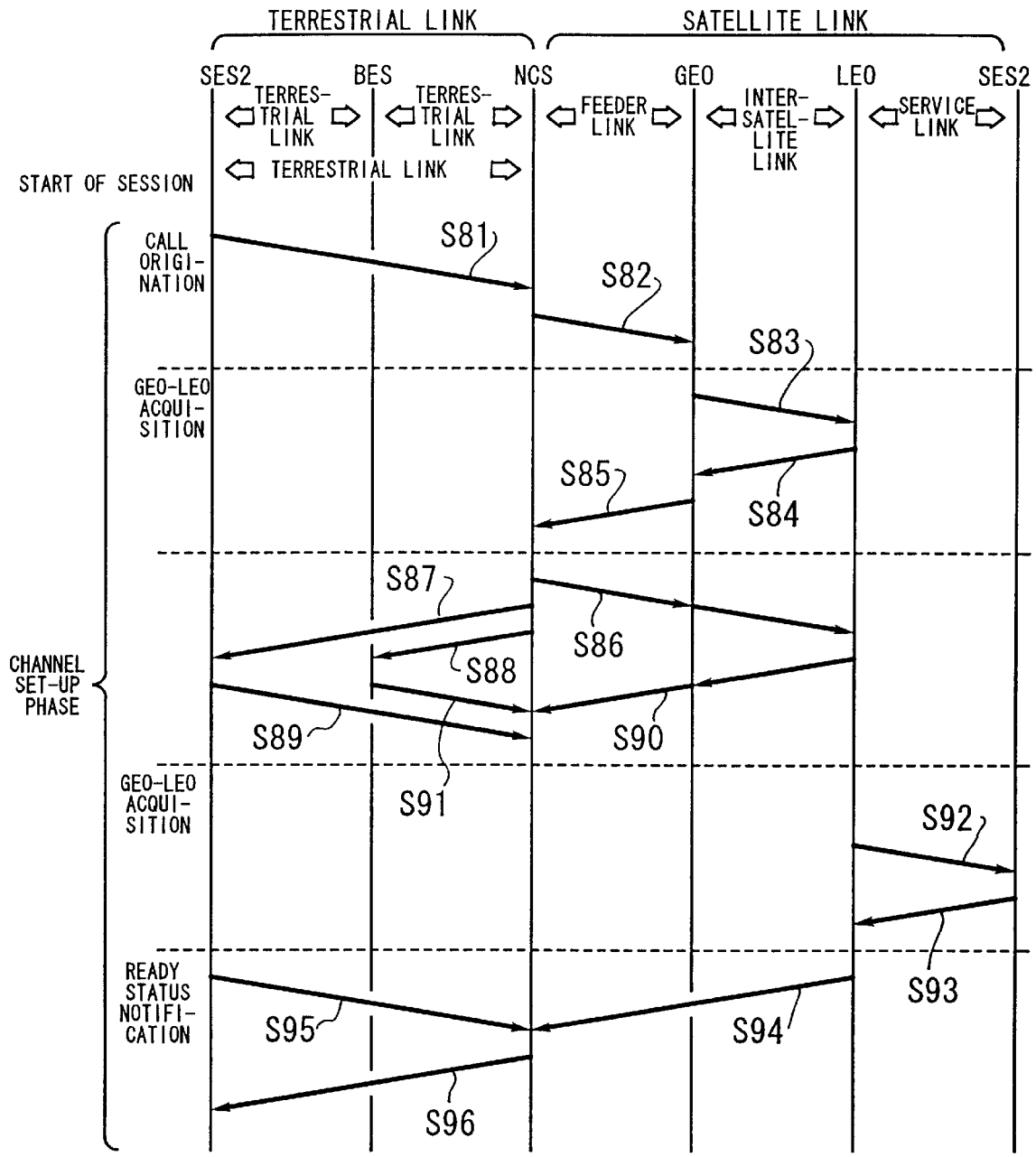
FIG. 15 is a sequence diagram showing a channel set-up phase in CASE 3.

FIG. 15 is a sequence diagram showing a channel set-up phase in CASE 3, whose details will be described below according to the order of step numbers shown therein.

[S81] Via the terrestrial network 18, the SES2 sends a channel set-up request to the NCS.

[S82] The NCS estimates the time required to transfer data and determines which low-earth orbiting satellite is the most suitable for the SES2. Here, the potential candidates are low-earth orbiting satellites that exist within the predetermined orbital range 22. Consider that the LEO is chosen by the NCS. The NCS then assigns a logical channel for the communication between the GEO and LEO and teaches an appropriate antenna direction to the GEO so that its acquisition and tracking system will catch the LEO.

[S83] The GEO starts acquisition and tracking of the LEO.

[S84] The LEO also starts acquisition and tracking of the GEO, thus setting up a communication channel therebetween.

[S85] The GEO notifies the NCS of the establishment of the GEO-LEO communication channel.

[S86] Via the GEO, the NCS supplies the LEO with the antenna direction for acquisition and tracking of the SES2. The LEO aims its antenna beam as taught by the NCS to prepare for acquisition and tracking of the SES2.

[S87] The NCS supplies the SES2 with the direction of the LEO, estimated arrival time of radio waves from the LEO, and estimated duration of communication. The SES2 aims the antenna in the direction taught by the NCS to get ready for the acquisition and tracking of the LEO.

[S88] The NCS notifies the sending station, i.e., the BES, of the scheduled transmission start time and communication duration.

[S89] Via the terrestrial network 18, the SES2 informs the NCS of the readiness for starting acquisition and tracking of the LEO.

[S90] Via the GEO, the LEO informs the NCS that it is ready for starting acquisition and tracking of the SES2.

[S91] Via the terrestrial network 18, the BES informs the NCS that it is ready for starting data transmission.

[S92] At the scheduled transmission start time, the LEO sends a downlink RF signal to the SES2 to trigger the acquisition and tracking system of the SES2.

[S93] Upon receipt of the downlink RF signal from the LEO, the SES2 sends an uplink RF signal to the LEO. The LEO receives the uplink RF signal, and it continues tracking of the SES2.

[S94] Via the GEO, the LEO informs the NCS that it has set up the communication channel.

[S95] Via the terrestrial network 18, the SES2 informs the NCS that it has successfully acquired the LEO. In addition to this, the SES2 notifies the NCS of the LEO's identification number.

[S96] Via the terrestrial network 18, the NCS informs the SES2 that the communication channel is established.

Figure 16:
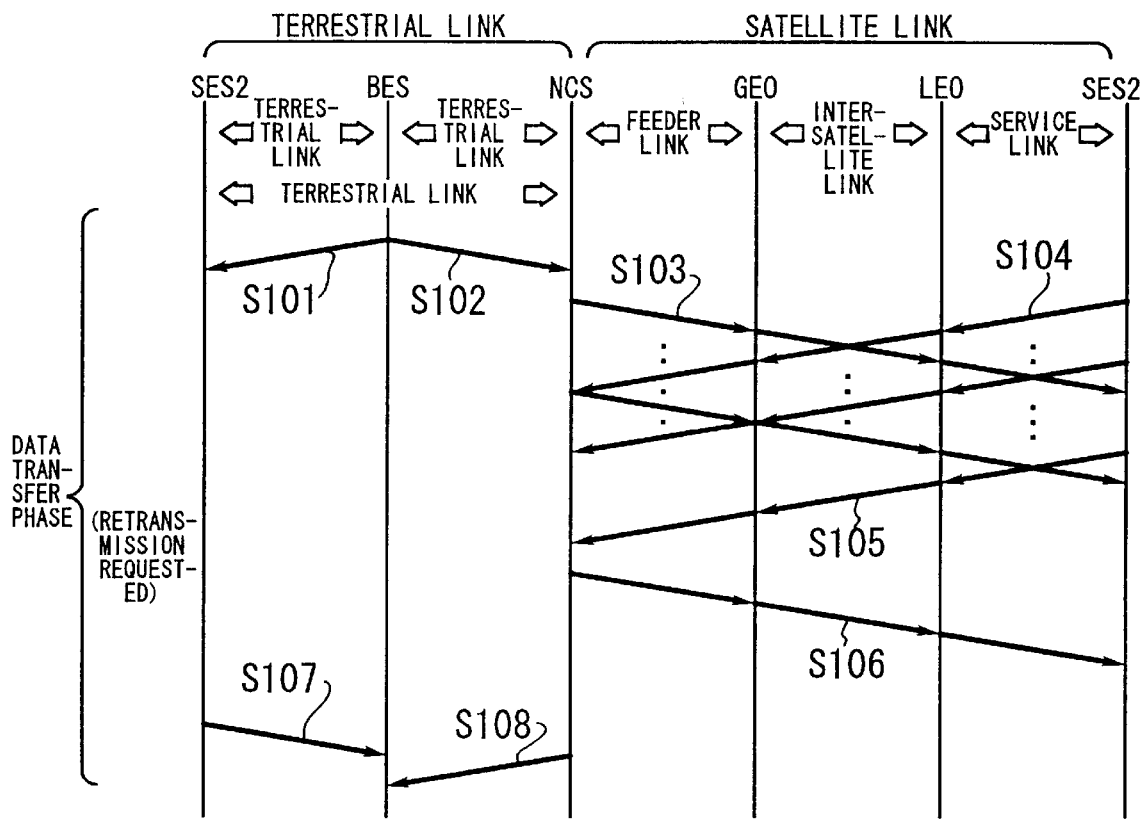
FIG. 16 is a sequence diagram showing a data transfer phase in CASE 3.

FIG. 16 is a sequence diagram showing a data transfer phase in CASE 3, whose details will be described below according to the order of step numbers shown therein.

[S101] The NCS permits the SES2 to start data transmission.

[S102] The NCS permits the BES to start data transmission.

[S103] The BES transmits data via the uplink to the GEO. Relayed by the GEO and then by the LEO, the transmitted data reaches the SES2.

[S104] The SES2 transmits data via the uplink to the LEO. Relayed by the LEO and then by the GEO, the transmitted data finally reaches the BES.

[S105] If there was a significant error that could not be recovered by the error correction function at the receiving station, the data should be retransmitted. Here, a selective retransmission algorithm is implemented to allow the sending station to retransmit only a particular frame that could not reach the destination. FIG. 16 illustrates that such a retransmission request initiated by the SES2 reaches the BES via the GEO-LEO satellite link.

[S106] Upon receipt of this retransmission request from the SES2, the BES retransmits the specified frame to the SES2 via the GEO-LEO satellite link.

[S107] Upon receipt of the retransmitted data, the SES2 notifies the NCS of the completion via the terrestrial network 18.

[S108] When the requested data retransmission is finished, the BES notifies the NCS of the completion via the terrestrial network 18.

Figure 17:
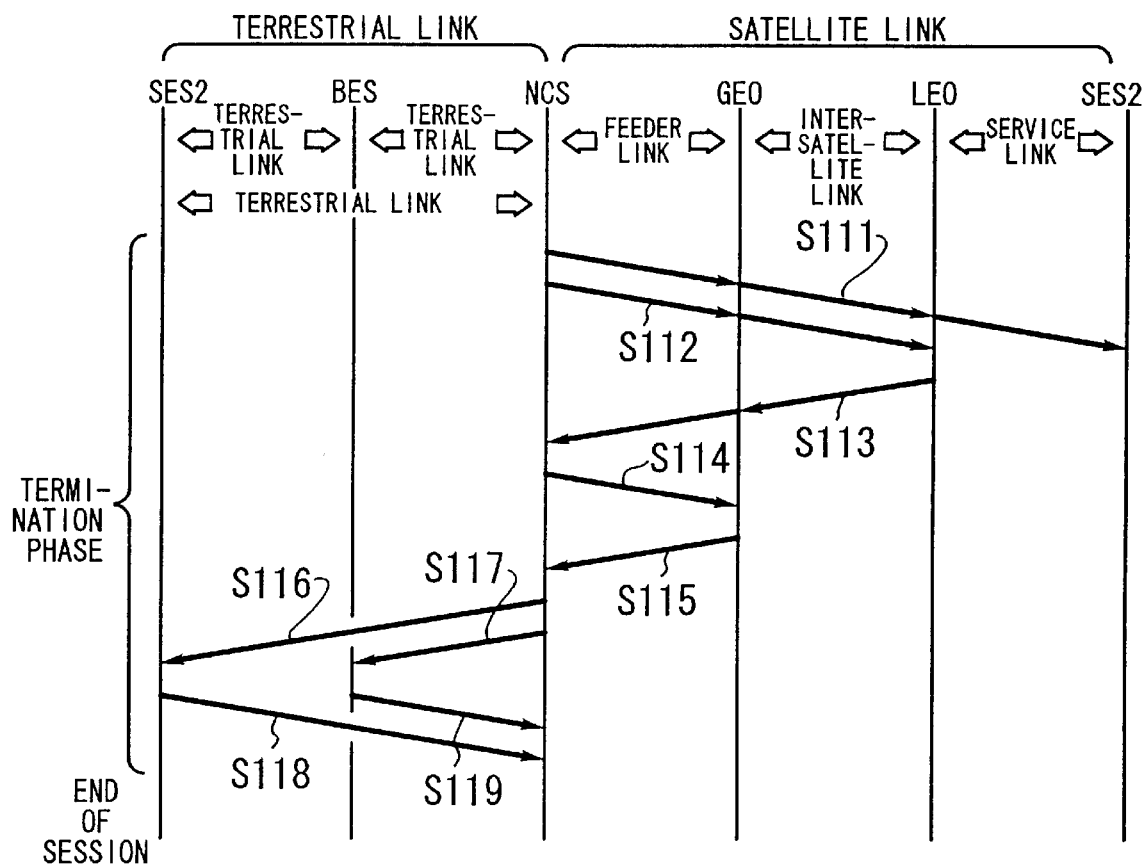
FIG. 17 is a sequence diagram showing a termination phase in CASE 3.

FIG. 17 is a sequence diagram showing a termination phase in CASE 3, whose details will be described below according to the order of step numbers shown therein.

[S111] Via the GEO-LEO satellite link, the NCS notifies the SES2 of the end of the data transmission. Accordingly, the SES2 terminates tracking of the LEO.

[S112] The NCS further notifies the LEO via the GEO of the end of the data transmission.

[S113] The LEO terminates tracking of the SES2 and releases the logical communication channel that has been assigned thereto. The LEO also sends its status information to the NCS via the GEO, and after that, it terminates tracking of the GEO.

[S114] The NCS notifies the GEO of the end of the data transmission.

[S115] The GEO terminates tracking of the LEO and releases the logical communication channel that has been assigned thereto. The LEO also sends its status information to the NCS.

[S116] Via the terrestrial network 18, the NCS notifies the SES2 of the end of the data transmission.

[S117] Via the terrestrial network 18, the NCS notifies the BES of the end of the data transmission.

[S118] The SES2 executes a termination process and sends its status information to the NCS via the terrestrial network 18.

[S119] The BES executes a termination process and sends its status information to the NCS via the terrestrial network 18.

CASE 4: BES-Originated Bidirectional Data Transfer

Figure 14:
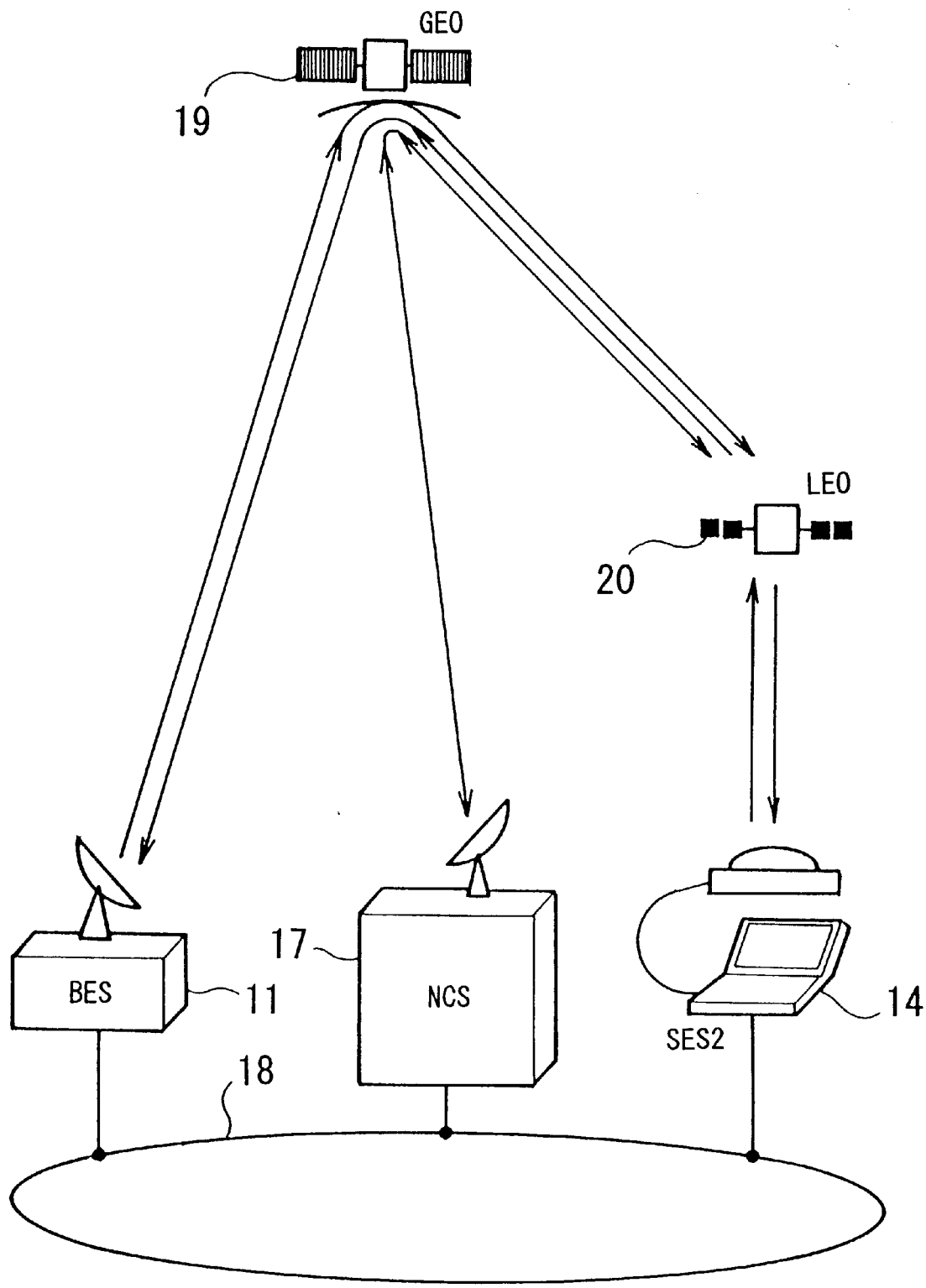
FIG. 14 is a simplified block diagram showing a bidirectional data transfer system.

CASE 4 is a bidirectional data transfer whose session is requested by the BES. Although most implementations may involve a plurality of big earth stations, small earth stations, and low-earth orbiting satellites, the following discussion assumes a simplified satellite communications system as shown in FIG. 14 for illustrative purposes, which comprises a big earth station (BES) 11, a small earth station (SES2) 14, a network control earth station (NCS) 17, a geostationary satellite (GEO) 19, and a low-earth orbiting satellite (LEO) 20. The acronyms in parentheses are used to refer to those entities in the system.

Figure 18:
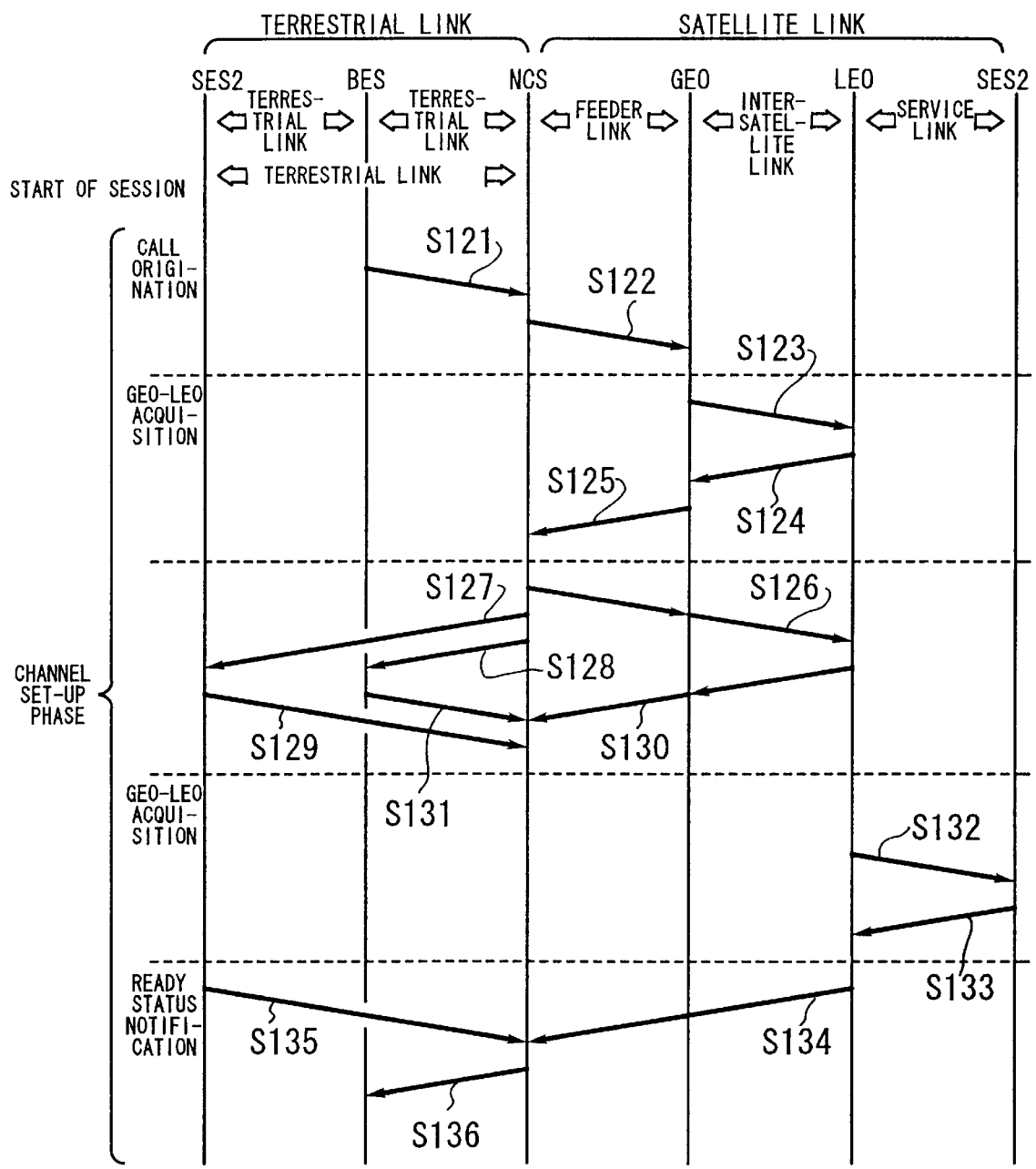
FIG. 18 is a sequence diagram showing a channel set-up phase in CASE 4.

FIG. 18 is a sequence diagram showing a channel set up phase in CASE 4, whose steps will be described below according to the order of step numbers attached thereto.

[S121] The BES sends a channel set-up request to the NCS via the terrestrial network 18.

[S122]–[S135] The detailed explanation for steps S122 to S135 is omitted here, since they are just the same as steps S82 to S95 described earlier in FIG. 15.

[S136] Via the terrestrial network 18, the NCS informs the BES that the requested communication channel is established.

Figure 19:
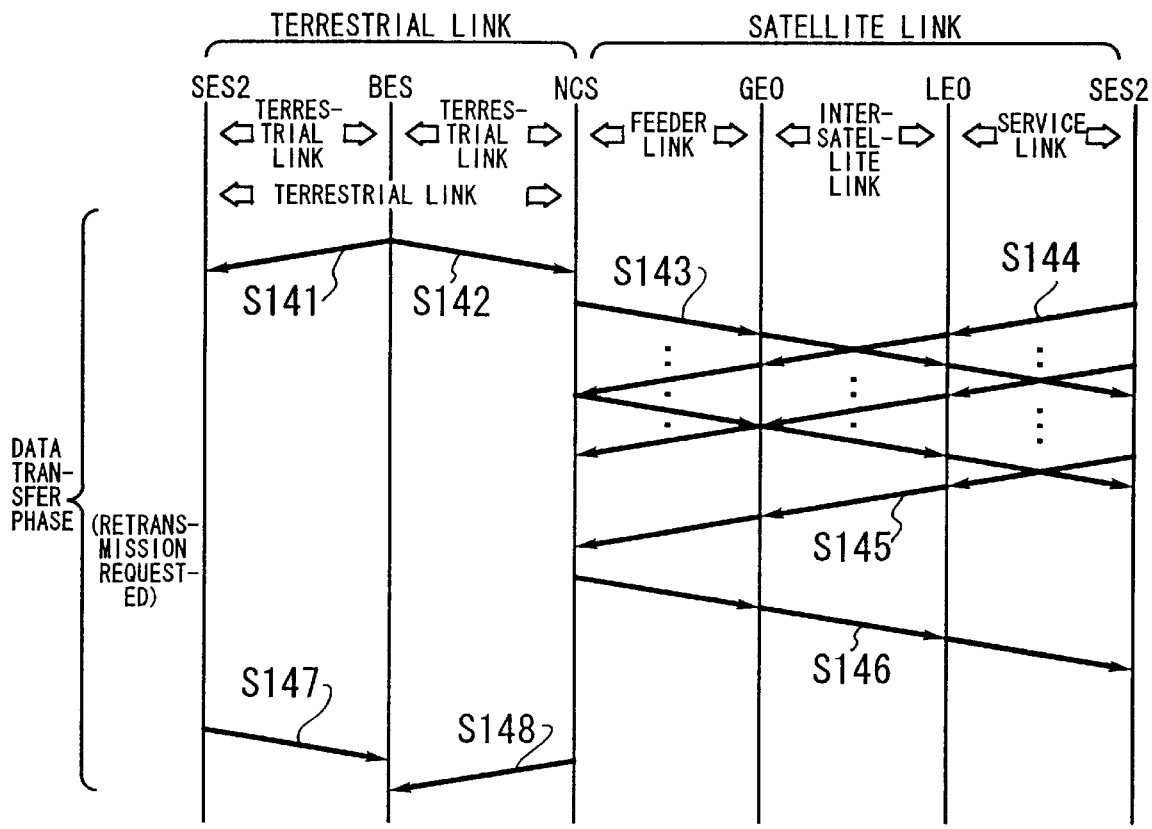
FIG. 19 is a sequence diagram showing a data transfer phase in CASE 4.

FIG. 19 is a sequence diagram showing a data transfer phase in CASE 4. The detailed explanation for steps S141 to S148 is omitted, since they are the same as steps S101 to S108 described earlier in FIG. 16.

Figure 20:
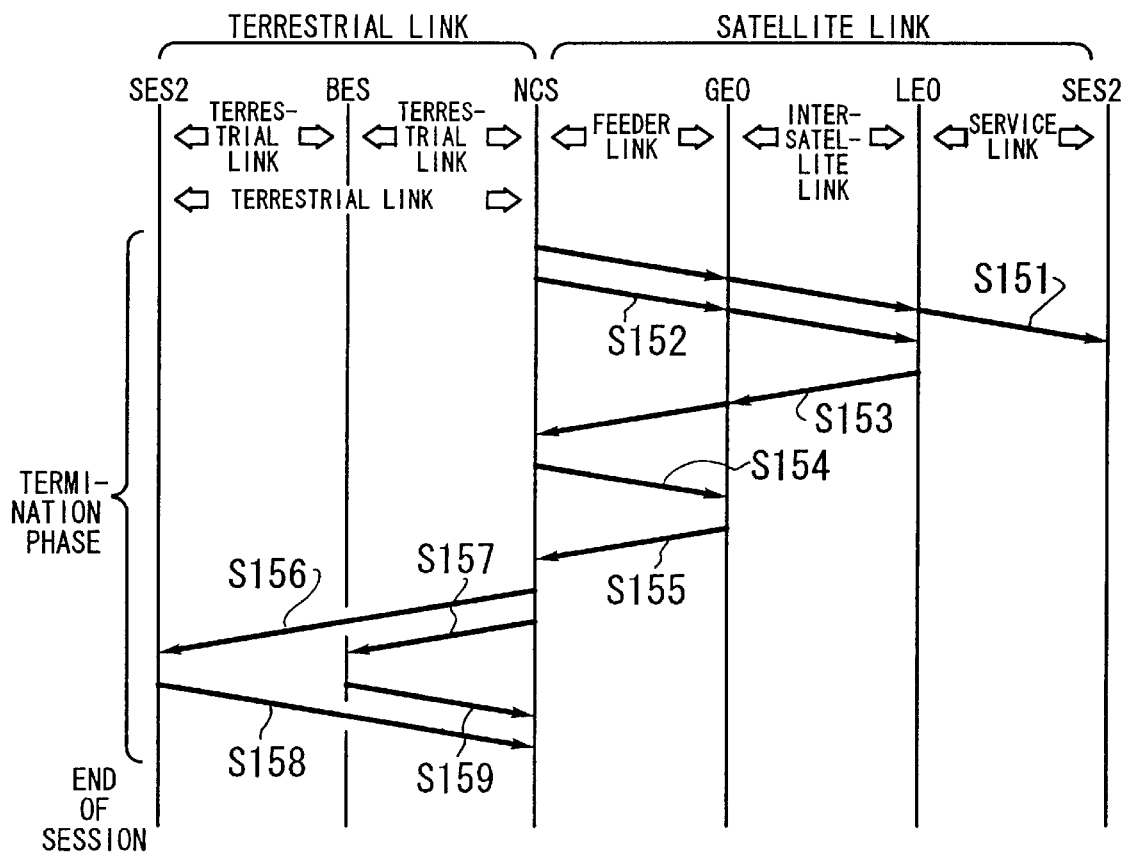
FIG. 20 is a sequence diagram showing a termination phase in CASE 4.

FIG. 20 is a sequence diagram showing a termination phase in CASE 4. The detailed explanation for steps S151 to S159 is omitted, since they are the same as steps S111 to S119 described earlier in FIG. 17.

In summary, the geostationary satellite 19 is designed to track only a limited number of low-earth orbiting satellites within the predetermined orbital range 22, which is smaller than the total coverage area of the geostationary satellite 19. This structural arrangement much contributes to simplification of antenna structure, acquisition and tracking system, repeater configuration and any other related functions in the geostationary satellite 19. It also simplifies the overall structure of the satellite communications system.

Further, because the geostationary satellite 19 operates in a high geosynchronous orbit, the big earth stations 11 and 12 can be located anywhere within its coverage area. The geostationary satellite 19 appears in a fixed direction when viewed from such big earth stations 11 and 12, allowing stable radio communications at any time. Furthermore, since the antenna beam from the big earth station 11 or 12 is directed at a constant elevation and azimuth angles, the same set of frequencies can be reused by other systems, thus enabling efficient use of radio bandwidth resources. The geostationary satellite 19 also allows the big earth stations 11 and 12 to communicate with each other.

In the case that a communication session between, for example, the big earth station 11 and the small earth station 14 could not be finished while the low-earth orbiting satellite 20 was in the predetermined orbital range 22, the network control earth station 17 will suspend the session until another low-earth orbiting satellite 21 enters to the predetermined orbital range 22. The network control earth station 17, upon acquisition of the low-earth orbiting satellite 21 within the predetermined orbital range 22, will resume the suspended session by using the newly captured low-earth orbiting satellite 21.

By introducing such an interrupt-and-resume scheme into the satellite communications system, it is possible to reduce the number of low-earth orbiting satellites in the system. Ultimately, even a system with a single low-earth satellite is operational.

Figure 21:
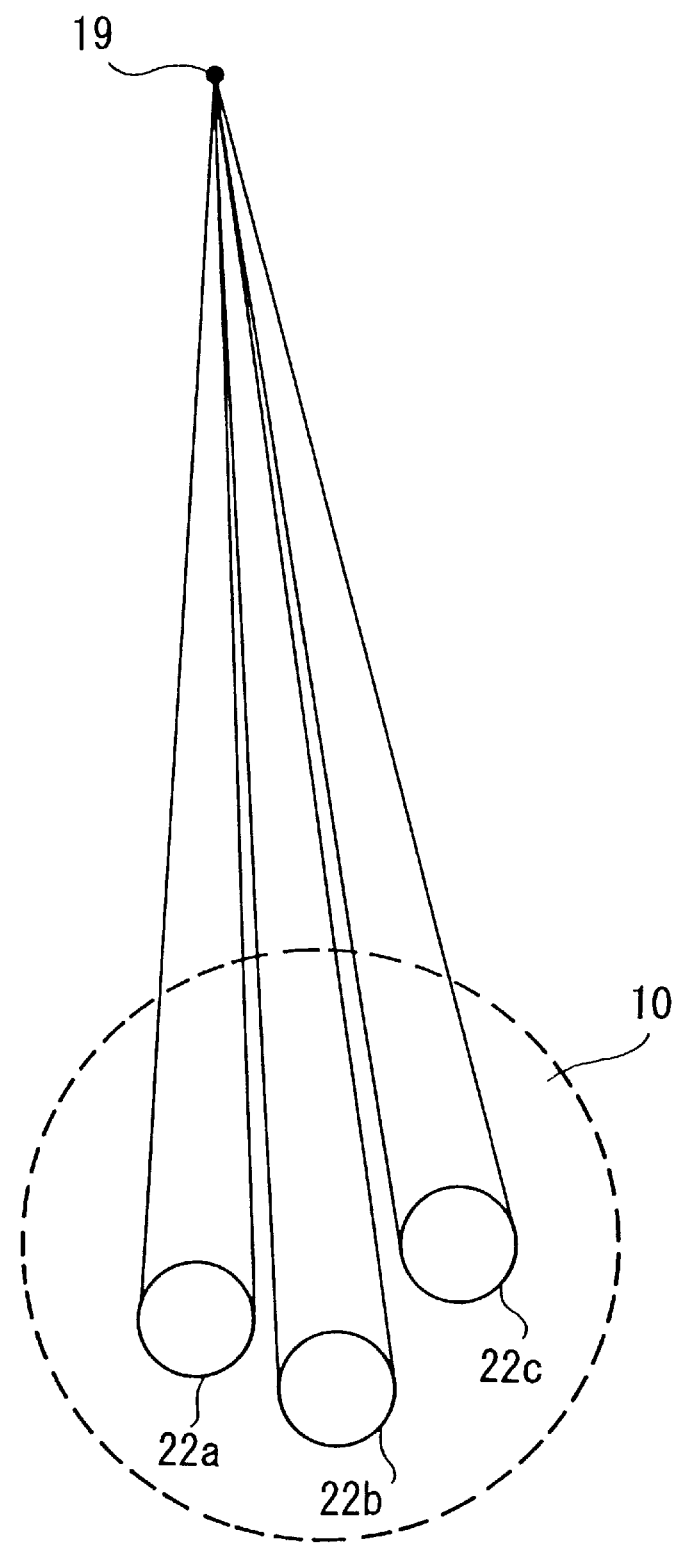
FIG. 21 is a diagram showing the operation of a multibeam antenna for a geostationary satellite in a second embodiment of the present invention.

Referring next to FIG. 21, a second embodiment of the present invention will be explained below. Since the second embodiment has basically the same structure as that of the first embodiment, the following description will focus on the distinctive points, while affixing like reference numerals to like elements.

The second embodiment differs from the first embodiment in the control method for the aforementioned multibeam antenna 19d as part of the geostationary satellite 19.

More specifically, FIG. 21 shows how the multibeam antenna 19d operates in the second embodiment of the present invention. In general, the usage rate of satellite communication is not constant throughout the day, but it is reduced particularly in the night. Recall that the earth 10 is rotating. This means that even if a large amount of daytime traffic is observed in some areas on the earth 10, the other areas in the nighttime are considered to be relatively inactive. That is, the increase in satellite network traffic occurs not globally buy just locally. Taking this into consideration, the second embodiment of the present invention allows the predetermined orbital range 22 to be changed according to Universal Time Coordinate (UTC) to reduce the number of multibeam antennas 19d that the geostationary satellite 19 must have.

FIG. 21 shows, for example, a first predetermined orbital range 22a corresponding to a first area on the earth 10 and a second predetermined orbital range 22b corresponding to a second area. The multibeam antenna 19d of the geostationary satellite 19 is presently pointed to the first predetermined orbital range 22a. At a certain time previously scheduled in Universal Time Coordinate, the multibeam antenna 19d changes its beam direction toward the second predetermined orbital range 22b.

However, there may be an area that exhibits high-level communication traffic throughout the day. In FIG. 21, a third predetermined orbital range 22c represents an orbital range for such an exceptionally busy area on the earth 10. To provide stable services to this area, the geostationary satellite 19 may have a fixed multibeam antenna dedicated to the third predetermined orbital range 22c.

The above-described control of the multibeam antenna 19d contributes to the size reduction of the geostationary satellite 19.

In an alternate arrangement of the second embodiment, the predetermined orbital range 22 will be changed in accordance with the frequency of connection requests from small earth stations. That is, the antenna beams are pointed at another area when the request frequency of that area exceeds a prescribed threshold.

Figure 22:
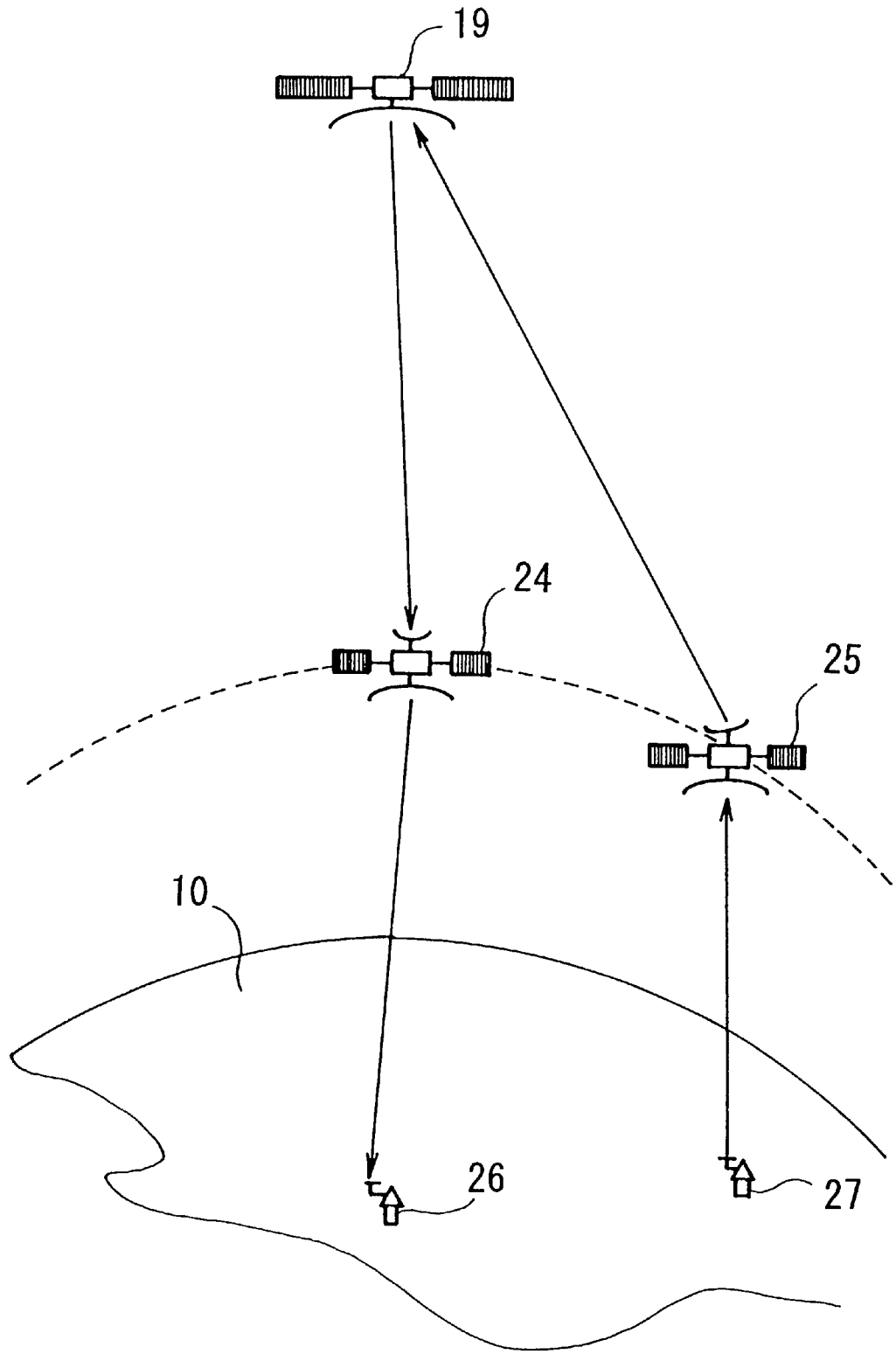
FIG. 22 is a diagram showing a low-earth orbiting satellite in a third embodiment of the present invention.

Referring next to FIG. 22, a third embodiment of the present invention will be explained below. Since the third embodiment has basically the same structure as that of the first embodiment, the following description will focus on its distinctive points, while affixing like reference numerals to like elements.

The third embodiment differs from the first embodiment in the structural arrangement of low-earth orbiting satellites.

FIG. 22 illustrates the third embodiment of the present invention, where a downlink-only satellite 24 and an uplink-only satellite 25 are deployed in a low earth orbit. This low-earth orbiting satellite 25 is dedicated to the uplink communication; it receives transmission signals from an earth station 27 and relays them to the a geostationary satellite 19. The low-earth orbiting satellite 24, on the other hand, is dedicated to the downlink communication; it receives transmission signals from the geostationary satellite 19 and relays them to another earth station 26.

Since there is no need to mount both transmitter and receiver, the individual low-earth orbiting satellites 24 and 25 will be simple and small.

The third embodiment makes an asymmetrical system configuration possible, where, for example, more downlink-only satellites are launched into low-earth orbits than uplink-only satellites. Such a configuration provide optimal performance distribution to some types of networks that require more downlink capacity as in broadcast or multicast services.

Figure 23:
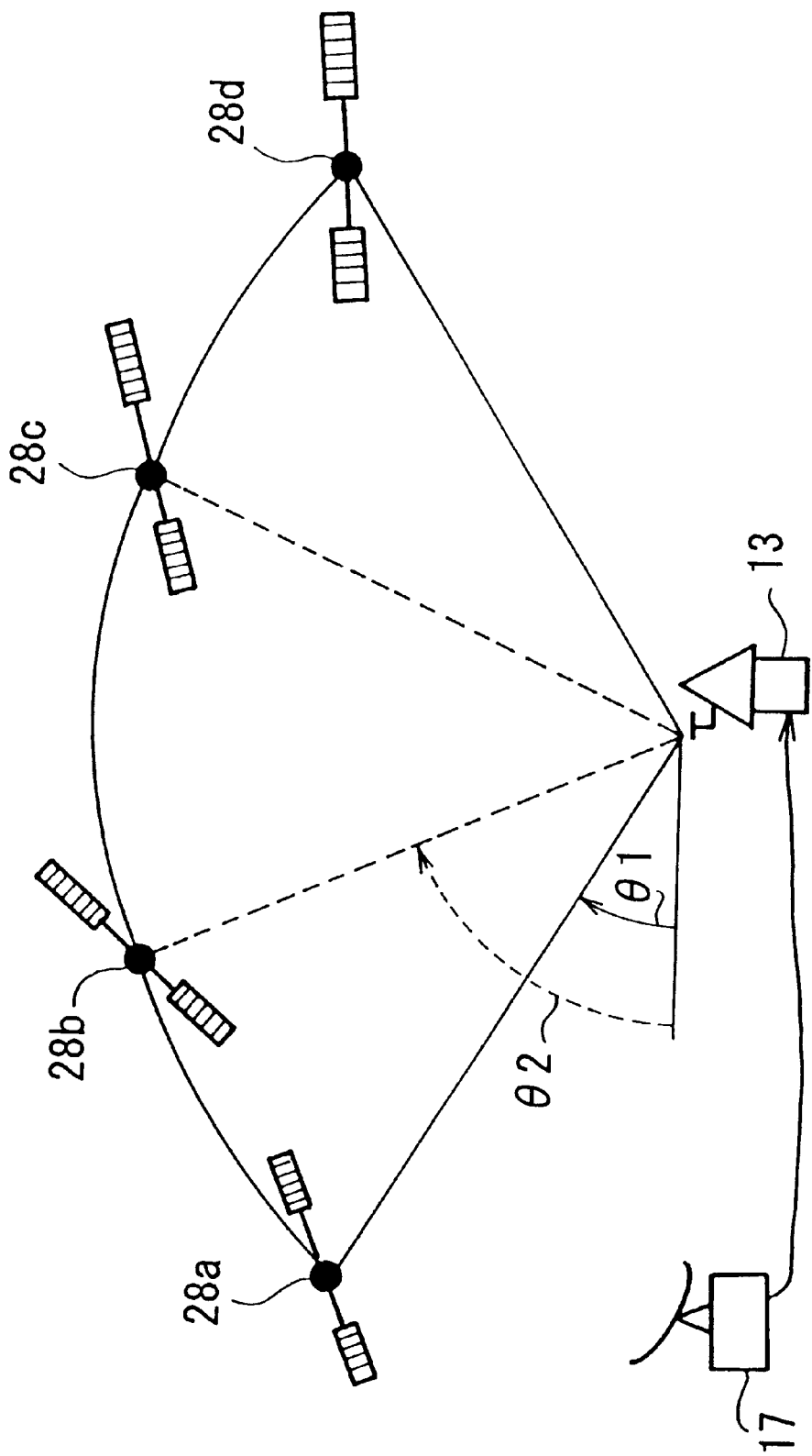
FIG. 23 is a diagram showing how a small earth station communicates with a low-earth orbiting satellite in a fourth embodiment of the present invention.

Referring next to FIG. 23, a fourth embodiment of the present invention will be explained below. Since the fourth embodiment has basically the same structure as that of the first embodiment, the following description will focus on the distinctive points, while affixing like reference numerals to like elements.

The fourth embodiment is distinguishable from the first embodiment in the communication between low-earth orbiting satellites and small earth stations.

FIG. 23 illustrates how a small earth station communicates with a low-earth orbiting satellite in the fourth embodiment of the present invention. In the fourth embodiment, the network control earth station 17 alters the minimum elevation angle of a low-earth orbiting satellite viewed from the small earth station 13, according to the weather conditions in each geographical region where the small earth station 13 is located. The elevation angle is defined as an angle formed by the horizontal plane and the antenna beam from a low-earth orbiting satellite to each earth station. As this elevation angle is smaller, the quality of transmission signals is degraded in general, and it is therefore necessary to set an appropriate minimum elevation angle that every earth station must maintain as a prerequisite requirement. The minimum elevation angle, however, is not constant but must be raised when it rains because of increased path loss. FIG. 23 shows that a low-earth orbiting satellite 28 is variously viewed from the small earth station 13, when it is located at different orbital positions (28a–28d). At present the minimum elevation angle θ1 is set for fine weather. However, when it begins raining, the network control earth station 17 changes the minimum elevation angle to θ2 to maintain a certain level of communication quality.

Figure 24:
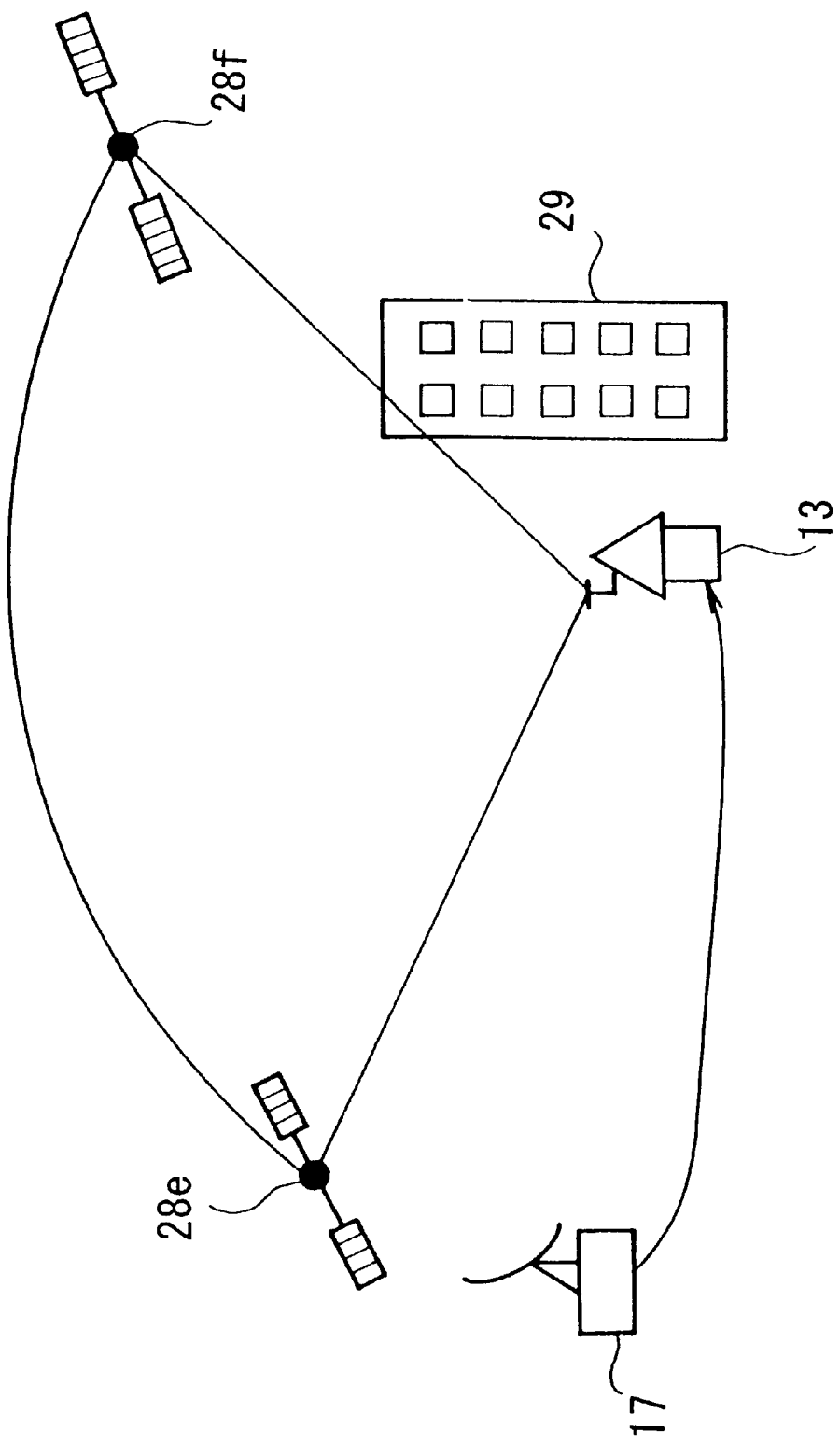
FIG. 24 is a diagram showing how a small earth station communicates with a low-earth orbiting satellite in a fifth embodiment of the present invention.
Figure 25:
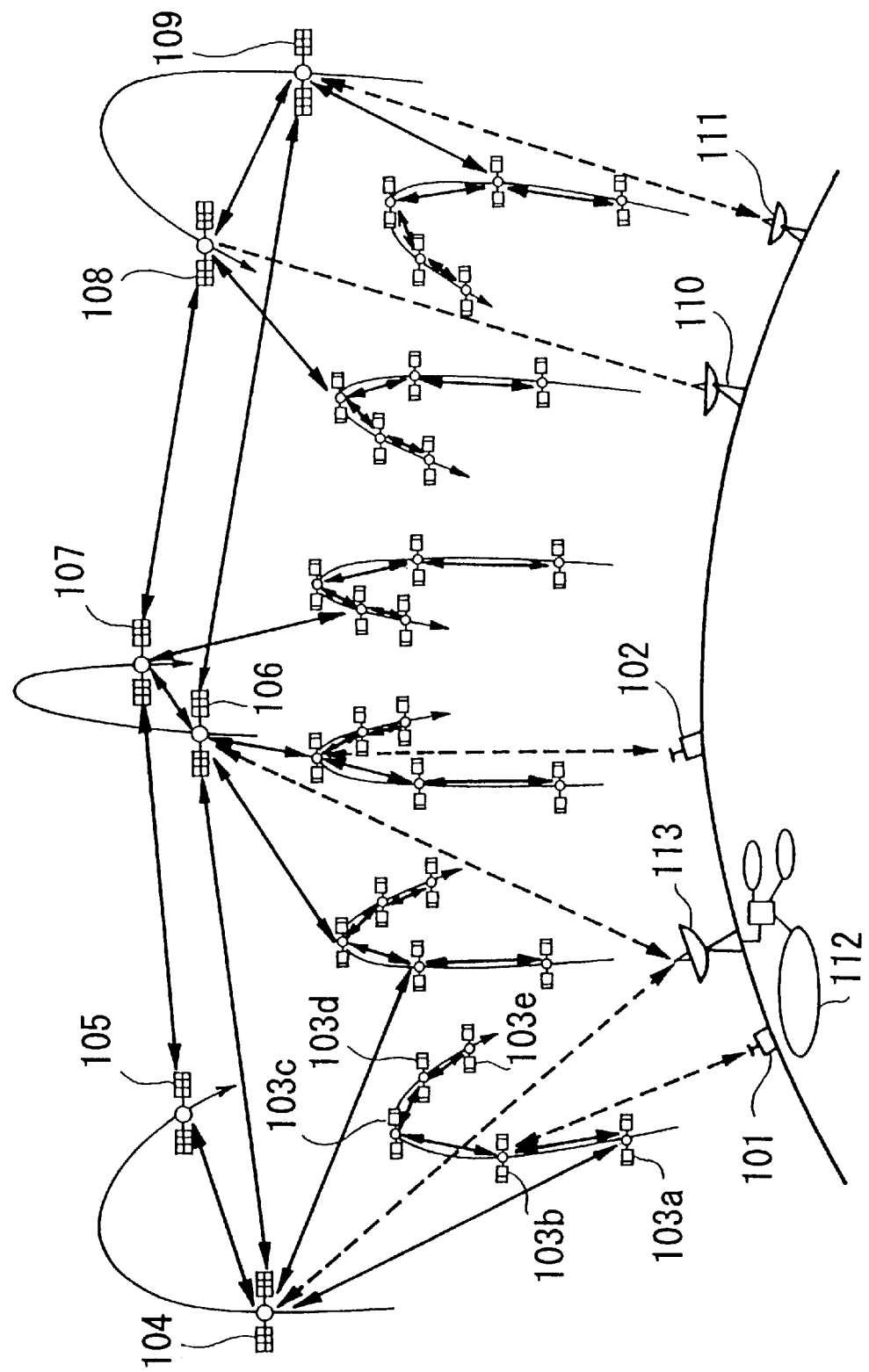
FIG. 25 is a diagram illustrating a conventional dual layer satellite communications network proposed by several researchers.

Referring lastly to FIG. 24, a fifth embodiment of the present invention will be explained below. Since the fifth embodiment has basically the same structure as that of the fourth embodiment, the following description will focus on its distinctive points, while affixing like reference numerals to like elements.

This fifth embodiment differs from the fourth embodiment in the elevation angle control in the communication between low-earth orbiting satellites and small earth stations.

FIG. 24 shows how a small earth station 13 communicates with a low-earth orbiting satellite 28 in the fifth embodiment, where satellites 28e and 28f are views of the same satellite 28 at different orbital positions. In the fifth embodiment, the network control earth station 17 alters the minimum elevation angle of a low-earth orbiting satellite viewed from the small earth station 13, considering the presence of obstacles to the radio communication. Assume here that the small earth station 13 is attempting to make access to the low-earth orbiting satellite 28 located at the orbital position 28f. Although the general requirement for the minimum elevation may be satisfied even in this case, a building 29 near the small earth station 13 acts as an obstacle to the line-of-sight radio communication. To avoid such a situation, the small earth station 13 sends its own minimum elevation angle requirement, which must be previously investigated, to the network control earth station 17. When starting a new session, the network control earth station 17 determines the tracking start and end times with reference to this station-specific minimum elevation angle that has been sent thereto. This control method prevents the satellite communication from being interrupted by the obstacles.

While the above-described first to fifth embodiments illustrated only a few low-earth orbiting satellites, much more satellites can be deployed in actual implementations. Further, the present invention does not intend to limit the number of geostationary satellites to one.

The above description of the embodiments of the present invention is summarized as follows. According to the present invention, a geostationary satellite circles the earth in a high-earth orbit. Tracking relay means disposed in this geostationary satellite is designed to keep track of only a limited number of low-earth orbiting satellites within an orbital range corresponding to a prescribed area of the earth's surface. The tracking relay means serves as a repeater that interconnects earth stations and low-earth orbiting satellites only when they are within the predetermined orbital range. More specifically, the geostationary satellite illuminates a prescribed coverage area on the earth's surface, but the tracking relay means does not support all the low-earth orbiting satellites flying above this coverage area. Rather, it tracks such satellites that are within a limited orbital range that is mapped onto a small part of the coverage area of the geostationary satellite. This makes the tracking relay means simple and small. The use of a geostationary orbit for the high-earth space segment simplifies satellite acquisition and tracking, as well as eliminating the necessity of intersatellite communications between low-earth orbiting satellites. Therefore, the implementation of such a satellite communication system is simple and easy. Furthermore, the present invention enables efficient use of radio wave resources because the antenna beam from each earth station to the geostationary satellite is pointed in a fixed direction.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A dual layer satellite communications system that allows a plurality of earth stations to communicate with one another by relaying transmission signals via satellites circling the earth in high earth and low earth orbits, comprising:

a first earth station located on the earth's surface;

a second earth station located on the earth's surface;

a geostationary satellite circling the earth in a high-earth geostationary orbit, which always faces a predetermined area on the earth;

a plurality of low-earth orbiting satellites circling the earth in low earth orbits for relaying transmission signals between said geostationary satellite and said first earth station;

tracking relay means, disposed in said geostationary satellite, for relaying transmission signals to/from said low-earth orbiting satellites, while tracking said low-earth orbiting satellites within an orbital range that corresponds to the predetermined area on the earth; and a network control station located on the earth's surface, which acquires relative positions of said first and second earth stations, said geostationary satellite, and said plurality of low-earth orbiting satellites, and sends tracking information to said first and second earth stations, said geostationary satellite, and said plurality of low-earth orbiting satellites wherein said network control station comprises time estimation means for estimating an entry time when one of the low-earth orbiting satellites enters to the orbital range and an exit time when said one of tie low-earth orbiting satellites exits from the orbital range, and sending the estimated entry time and the estimated exit time to said first and second earth stations, said geostationary satellite, and said plurality of low-earth orbiting satellites.

2. The dual layer satellite communications system according to claim 1, wherein said network control station comprises restarting means for, when said low-earth satellites have all left the orbital range and an ongoing communication session between said first and second earth stations is thus interrupted, restarting the communication session between said first and second earth stations after waiting for one of said low-earth orbiting satellites to enter to said orbital range.

3. The dual layer satellite communications system according to claim 1, further comprising area changing means for changing said orbital range when a predetermined condition is satisfied.

4. The dual layer satellite communications system according to claim 3, wherein said predetermined condition is satisfied when a time previously scheduled in Universal Time Coordinate has come.

5. The dual layer satellite communications system according to claim 3, wherein said predetermined condition is satisfied when a frequency of communication requests from the earth stations exceeds a predetermined threshold.

6. The dual layer satellite communications system according to claim 1, wherein said plurality of low-earth orbiting satellites includes low-earth orbiting satellites dedicated to either uplink communications or downlink communications.

7. The dual layer satellite communications system according to claim 1, wherein said network control station comprises elevation angle updating means for updating a minimum elevation angle that enables said first earth station to communicate with said low-earth orbiting satellites, according to weather conditions.

8. The dual layer satellite communications system according to claim 1, wherein said network control station comprises elevation angle registration means for previously registering a minimum elevation angle that enables said first earth station to communicate with said low-earth orbiting satellites, time determination means for determining tracking start time and tracking end time to control mutual tracking of said first earth station and one of said low-earth orbiting satellites facing the first earth station according to the minimum elevation angle that is registered in said elevation angle registration means.

9. A geostationary satellite for dual layer satellite communications system that allows a plurality of earth stations to communicate with one another by relaying transmission signals via satellites circling the earth in high earth and low earth orbits, comprising tracking relay means for tracking low-earth orbiting satellites, only within an orbital range that is mapped onto a part of the corresponding predetermined area on the earth that the geostationary satellite always faces, to relay transmission signals to/from low-earth orbiting satellites, wherein the tracking relay means is responsive to tracking information and timing information sent from a network control station located on the earth's surface.

10. The geostationary satellite according to claim 9, further comprising area changing means for changing said orbital range when a predetermined condition is satisfied.

11. The geostationary satellite according to claim 10, wherein said predetermined condition is satisfied when a time previously scheduled in Universal Time Coordinate has come.

12. The geostationary satellite according to claim 10, wherein said predetermined condition is satisfied when a frequency of communication requests from the earth stations exceeds a predetermined threshold.

* * * * *